United States Patent
Shiratori et al.

(10) Patent No.: US 10,670,432 B2
(45) Date of Patent: Jun. 2, 2020

(54) DEFLECTION ANGLE DETECTION DEVICE

(71) Applicant: DENSO WAVE INCORPORATED, Chita-gun, Aichi-pref. (JP)

(72) Inventors: Hiroaki Shiratori, Chita-gun (JP); Daisuke Kawase, Chita-gun (JP); Takafumi Fukuoka, Chita-gun (JP); Yuto Kawachi, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 447 days.

(21) Appl. No.: 15/692,301

(22) Filed: Aug. 31, 2017

(65) Prior Publication Data

US 2018/0066965 A1 Mar. 8, 2018

(30) Foreign Application Priority Data

Sep. 2, 2016 (JP) ................................. 2016-172104

(51) Int. Cl.
    *G01D 5/347* (2006.01)
    *G01B 7/312* (2006.01)
    *G01B 11/26* (2006.01)
    *G01D 5/249* (2006.01)

(52) U.S. Cl.
    CPC ........... *G01D 5/3473* (2013.01); *G01B 7/312* (2013.01); *G01B 11/26* (2013.01); *G01D 5/2497* (2013.01)

(58) Field of Classification Search
    CPC .. G01D 5/3473; G01D 5/2497; G01D 5/2454; G01B 7/312; G01B 11/26; G01L 3/10
    See application file for complete search history.

(56) References Cited

U.S. PATENT DOCUMENTS

| 5,418,441 | A | 5/1995 | Furukawa | |
|---|---|---|---|---|
| 2012/0041691 | A1* | 2/2012 | Fericean | G01D 5/202 702/41 |
| 2015/0276436 | A1* | 10/2015 | Hasebe | B25J 9/126 74/490.03 |

FOREIGN PATENT DOCUMENTS

| JP | 2007064771 | * 3/2007 |
| JP | 2010269412 | * 12/2010 |

\* cited by examiner

*Primary Examiner* — Catherine T. Rastovski
(74) *Attorney, Agent, or Firm* — Oliff PLC

(57) ABSTRACT

A deflection angle detection device includes an input shaft encoder, a disk attached to an output shaft of a speed reducer, an output shaft encoder having detection elements disposed at mutually different positions with respect to the disk to detect angular positions of the disk. A basic angular position of the output shaft is calculated based on an angular position of the input shaft detected by the input shaft encoder, a first, a second, and a third angular positions of the output shaft are calculated based on the angular positions of the disk detected by a plurality of detecting elements, and the deflection angle of the output shaft is calculated based on a first, a second, and a third differences, which are differences between the basic angular position and the first, the second, and the third angular positions, respectively, and positions of the detection elements with respect to the disk.

15 Claims, 15 Drawing Sheets

FIG.19

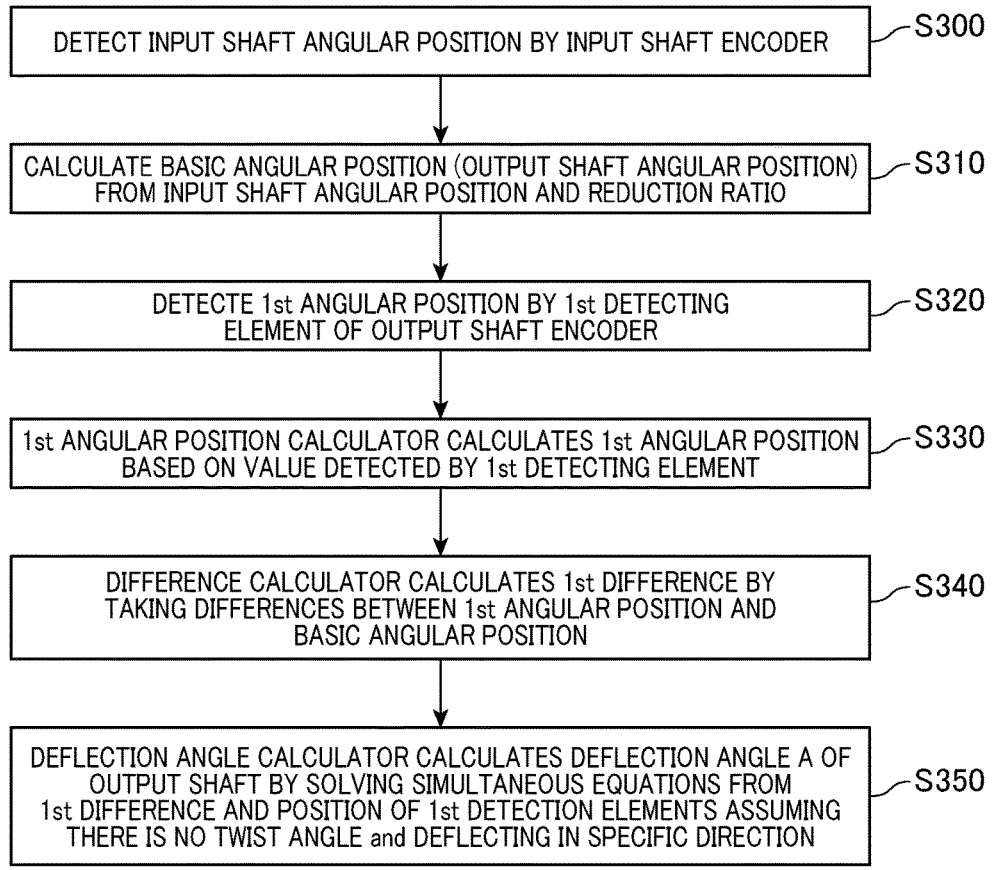

- DETECT INPUT SHAFT ANGULAR POSITION BY INPUT SHAFT ENCODER — S300
- CALCULATE BASIC ANGULAR POSITION (OUTPUT SHAFT ANGULAR POSITION) FROM INPUT SHAFT ANGULAR POSITION AND REDUCTION RATIO — S310
- DETECTE 1st ANGULAR POSITION BY 1st DETECTING ELEMENT OF OUTPUT SHAFT ENCODER — S320
- 1st ANGULAR POSITION CALCULATOR CALCULATES 1st ANGULAR POSITION BASED ON VALUE DETECTED BY 1st DETECTING ELEMENT — S330
- DIFFERENCE CALCULATOR CALCULATES 1st DIFFERENCE BY TAKING DIFFERENCES BETWEEN 1st ANGULAR POSITION AND BASIC ANGULAR POSITION — S340
- DEFLECTION ANGLE CALCULATOR CALCULATES DEFLECTION ANGLE A OF OUTPUT SHAFT BY SOLVING SIMULTANEOUS EQUATIONS FROM 1st DIFFERENCE AND POSITION OF 1st DETECTION ELEMENTS ASSUMING THERE IS NO TWIST ANGLE and DEFLECTING IN SPECIFIC DIRECTION — S350

FIG.20

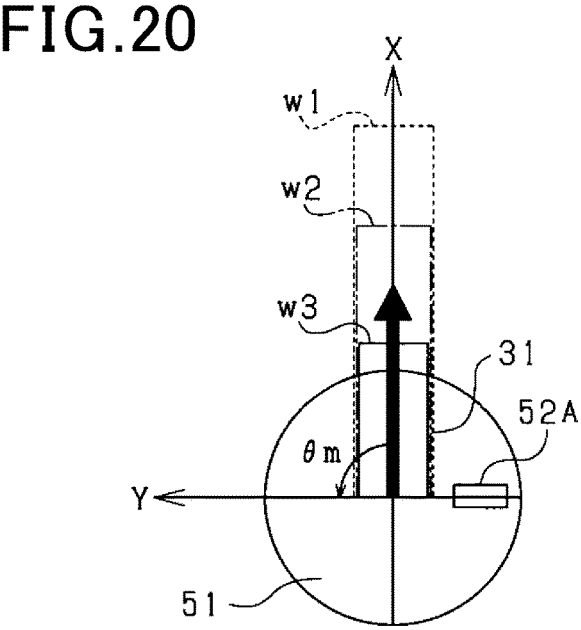

DEFLECTION ANGLE DETECTION DEVICE

CROSS-REFERENCE TO RELATED APPLICATION

This application is based on and claims the benefit of priority from earlier Japanese Patent Application No. 2016-172104 filed Sep. 2, 2016, the description of which is incorporated herein by reference.

TECHNICAL FIELD

The present disclosure relates to a deflection angle detecting device for detecting a deflection angle of a rotating shaft of a robot or the like.

BACKGROUND

Conventionally, there is a device that obtains deflection angle of each rotation axis of a robot from joint torque by first obtaining joint torque applied to respective rotation axes from an attitude of the robot corresponding to a hand position command value of the robot, and by using a displacement model that shows a relationship between the joint torque and the deflection angle (refer to Patent Document 1: Japanese Patent Application Laid-Open Publication No. 4-233602).

However, in the device described in Patent Document 1, the deflection angle cannot be obtained accurately when the relationship between the joint torque and the deflection angle in the displacement model deviates from an actual relationship or when an external force acts on the rotation axis of the robot.

In addition, although it is also conceivable to detect the deflection angle with a high-performance camera or a dedicated deflection angle sensor, it is necessary to newly add a high-precision sensor or the like, and the change from the existing configuration becomes large.

SUMMARY

An embodiment provides a deflection angle detection device capable of accurately detecting a deflection angle while suppressing an existing configuration from changing.

A deflection angle detection device according to a first aspect includes an input shaft encoder that detects an angular position of an input shaft of a speed reducer, a disk attached to an output shaft of the speed reducer, and an output shaft encoder having a first detection element, a second detection element, and a third detection element disposed at different positions with respect to the disk and which are respectively detect an angular position of the disk.

The deflection angle detection device further includes a basic angular position calculator that calculates a basic angular position that is an angular position of the output shaft based on the angular position of the input shaft detected by the input shaft encoder, a first angular position calculator that calculates a first angular position that is an angular position of the output shaft based on an angular position of the disk detected by the first detection element, a second angular position calculator that calculates a second angular position that is an angular position of the output shaft based on an angular position of the disk detected by the second detecting element, and a third angular position calculator that calculates a third angular position that is an angular position of the output shaft based on an angular position of the disk detected by the third detecting element.

The deflection angle detection device further includes a difference calculator that calculates a first difference which is a difference between the basic angular position calculated by the basic angular position calculator and the first angular position calculated by the first angular position calculator, a second difference which is a difference between the basic angular position and the second angular position calculated by the second angular position calculator, and a third difference which is a difference between the basic angular position and the third angular position calculated by the third angular position calculator, and a deflection angle calculator that calculates a deflection angle of the output shaft based on the first difference, the second difference, and the third difference calculated by the difference calculator, and positions of the first detection element, the second detection element, and the third detection element with respect to the disk.

According to the above configuration, the angular position of the input shaft of the speed reducer is detected by the input shaft encoder.

Further, in the output shaft encoder, the angular positions of the disk are respectively detected by the first, second, and third detection elements disposed at mutually different positions with respect to the disk which is attached to the output shaft of the speed reducer.

Then, the basic angular position calculator calculates the basic angular position which is the angular position of the output shaft based on the angular position of the input shaft detected by the input shaft encoder.

The angular position of the output shaft can be calculated based on the angular position of the input shaft and a reduction ratio of the speed reducer.

This basic angular position corresponds to an angular position of the output shaft in a state where it is not affected by twist due to deflection and elastic deformation.

The first angular position, the second angular position, and the third angular position, which are angular positions of the output shaft, are calculated based on the angular position of the disk respectively detected by the first detection element, the second detection element, and the third detection element by the first angular position calculator, the second angular position calculator, and the third angular position calculator.

Further, the first difference that is a difference between the calculated basic angular position and the first angular position, the second difference that is a difference between the calculated basic angular position and the calculated second angular position, and the third difference that is a difference between the basic angular position and the third angular position are calculated by the difference calculator.

Here, when the output shaft is deflected and tilted or the output shaft is twisted by elastic deformation, the relative position between the disk attached to the output shaft 31 and the plurality of detection elements for detecting the angular position of the disk changes.

Then, the first detection element, the second detection element, and the third detection element are disposed at different positions with respect to the disc.

Therefore, the first difference, the second difference, and the third difference calculated become different from each other when the disk attached to the output shaft is tilted due to deflection of the output shaft.

These first, second, third differences and the positions of the first detection element, the second detection element, and the third detection element with respect to the disk, the deflection angle of the output shaft 31, the deflection direction, and the twist angle due to elastic deformation have a correlation, and a relational expression is established between them.

The positions of the first detection element, the second detection element, and the third detection element with respect to the disk are known, and the correlation between the calculated difference values and deflection angle, the deflection direction, and the twist angle due to elastic deformation of the output shaft is established to the respective first detection element, the second detection element, and the third detection element.

That is, the number of the relational expressions is equal to or more than unknown state quantities (a deflection angle, a deflection direction, and a twist angle due to elastic deformation).

Therefore, the deflection angle of the output shaft can be calculated based on the calculated first difference, the second difference, the third difference, and the positions of the first detection element, the second detection element, and the third detection element with respect to the disk.

As a result, the deflection angle of the output shaft can be detected based on the angular positions detected by the detection element of the input shaft encoder and the three detection elements of the output shaft encoder only by increasing the number of detection elements of the output shaft encoder even when the external force is acting on the output shaft.

Therefore, it is possible to accurately detect the deflection angle while suppressing the existing configuration from changing.

A deflection angle detection device according to a second aspect includes an input shaft encoder that detects an angular position of an input shaft of a speed reducer, a disk attached to an output shaft of the speed reducer, and an output shaft encoder having a first detection element, a second detection element, and a third detection element disposed at different positions with respect to the disk and which are respectively detect an angular position of the disk.

The deflection angle detection device further includes a basic angular position calculator that calculates a basic angular position that is an angular position of the output shaft based on the angular position of the input shaft detected by the input shaft encoder, a first angular position calculator that calculates a first angular position that is an angular position of the output shaft based on an angular position of the disk detected by the first detection element, and a second angular position calculator that calculates a second angular position that is an angular position of the output shaft based on an angular position of the disk detected by the second detecting element.

The deflection angle detection device further includes a difference calculator that calculates a first difference which is a difference between the basic angular position calculated by the basic angular position calculator and the first angular position calculated by the first angular position calculator, and a second difference which is a difference between the basic angular position and the second angular position calculated by the second angular position calculator, and a deflection angle calculator that calculates a deflection angle of the output shaft based on the first difference and the second difference calculated by the difference calculator, and positions of the first detection element and the second detection element with respect to the disk assuming that there is no influence of twist due to elastic deformation of the output shaft.

A deflection angle detection device according to a third aspect includes an input shaft encoder that detects an angular position of an input shaft of a speed reducer, and an output shaft encoder having a disk and a first detection element that detects an angular position of the disk.

The deflection angle detection device further includes a basic angular position calculator that calculates a basic angular position that is an angular position of the output shaft based on the angular position of the input shaft detected by the input shaft encoder, a first angular position calculator that calculates a first angular position that is an angular position of the output shaft based on an angular position of the disk detected by the first detection element, a difference calculator that calculates a first difference which is a difference between the basic angular position calculated by the basic angular position calculator and the first angular position calculated by the first angular position calculator, and a deflection angle component calculator that calculates a deflection angle component of the output shaft with respect to a predetermined direction based on the first difference calculated by the difference calculator, and a position of the first detection element with respect to the disk assuming that there is no influence of twist due to elastic deformation of the output shaft.

A deflection angle detection device according to a fourth aspect includes an input shaft encoder that detects an angular position of an input shaft of a speed reducer, a disk attached to an output shaft of the speed reducer, and an output shaft encoder having a first detection element, a second detection element, and a third detection element disposed at different positions with respect to the disk and which are respectively detect an angular position of the disk.

The deflection angle detection device further includes a basic angular position calculator that calculates a basic angular position that is an angular position of the output shaft based on the angular position of the input shaft detected by the input shaft encoder, a first angular position calculator that calculates a first angular position that is an angular position of the output shaft based on an angular position of the disk detected by the first detection element and an position of the first detecting element with respect to the disk, a second angular position calculator that calculates a second angular position that is an angular position of the output shaft based on an angular position of the disk detected by the second detecting element and an position of the second detecting element with respect to the disk, and a third angular position calculator that calculates a third angular position that is an angular position of the output shaft based on an angular position of the disk detected by the third detecting element and a position of the third detecting element with respect to the disk.

The deflection angle detection device further includes a difference calculator that calculates a first difference which is a difference between the basic angular position calculated by the basic angular position calculator and the first angular position calculated by the first angular position calculator, a second difference which is a difference between the basic angular position and the second angular position calculated by the second angular position calculator, and a third difference which is a difference between the basic angular position and the third angular position calculated by the third angular position calculator.

BRIEF DESCRIPTION OF THE DRAWINGS

In the accompanying drawings:

FIG. 19 shows a flowchart of a calculation of a deflection angle of an output shaft according to the third embodiment;

FIG. 20 shows a projection view of a positional relationship between the output shaft and the detection element;

DETAILED DESCRIPTION OF THE PREFERRED EMBODIMENT

First Embodiment

Hereinafter, a first embodiment will be described with reference to the drawings.

The present embodiment is embodied in a deflection angle detection device for detecting a deflection angle of a rotation axis in a joint that connects rotation axes of an articulated robot.

Figure 1:
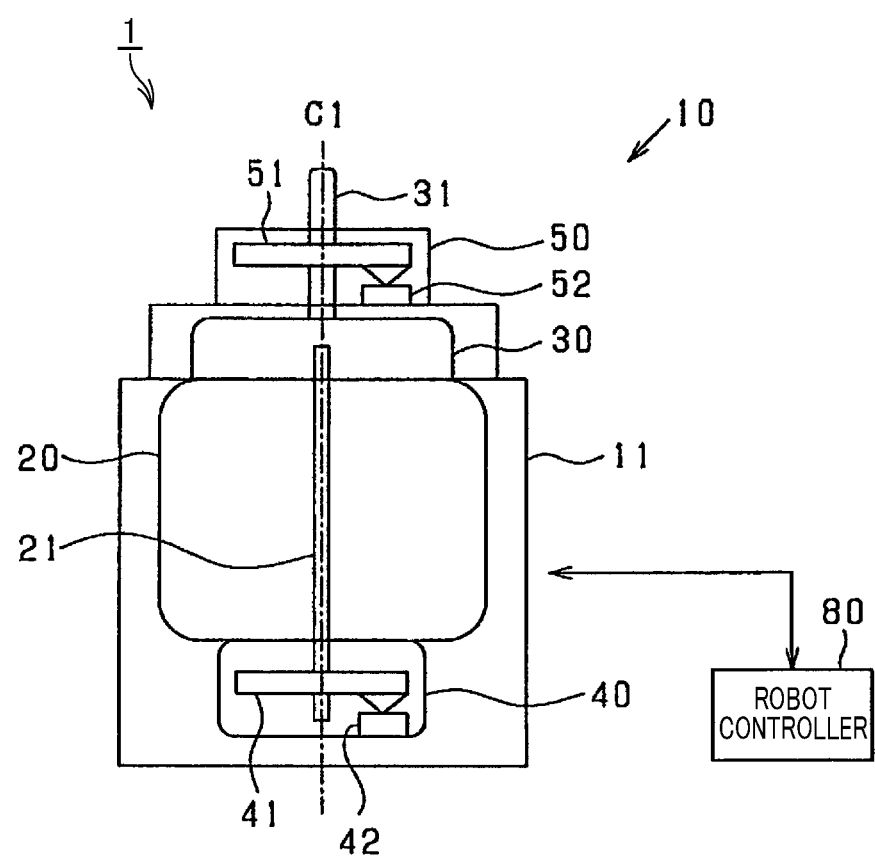
FIG. 1 shows a schematic diagram of a joint of a robot and a robot controller.
Figure 2:
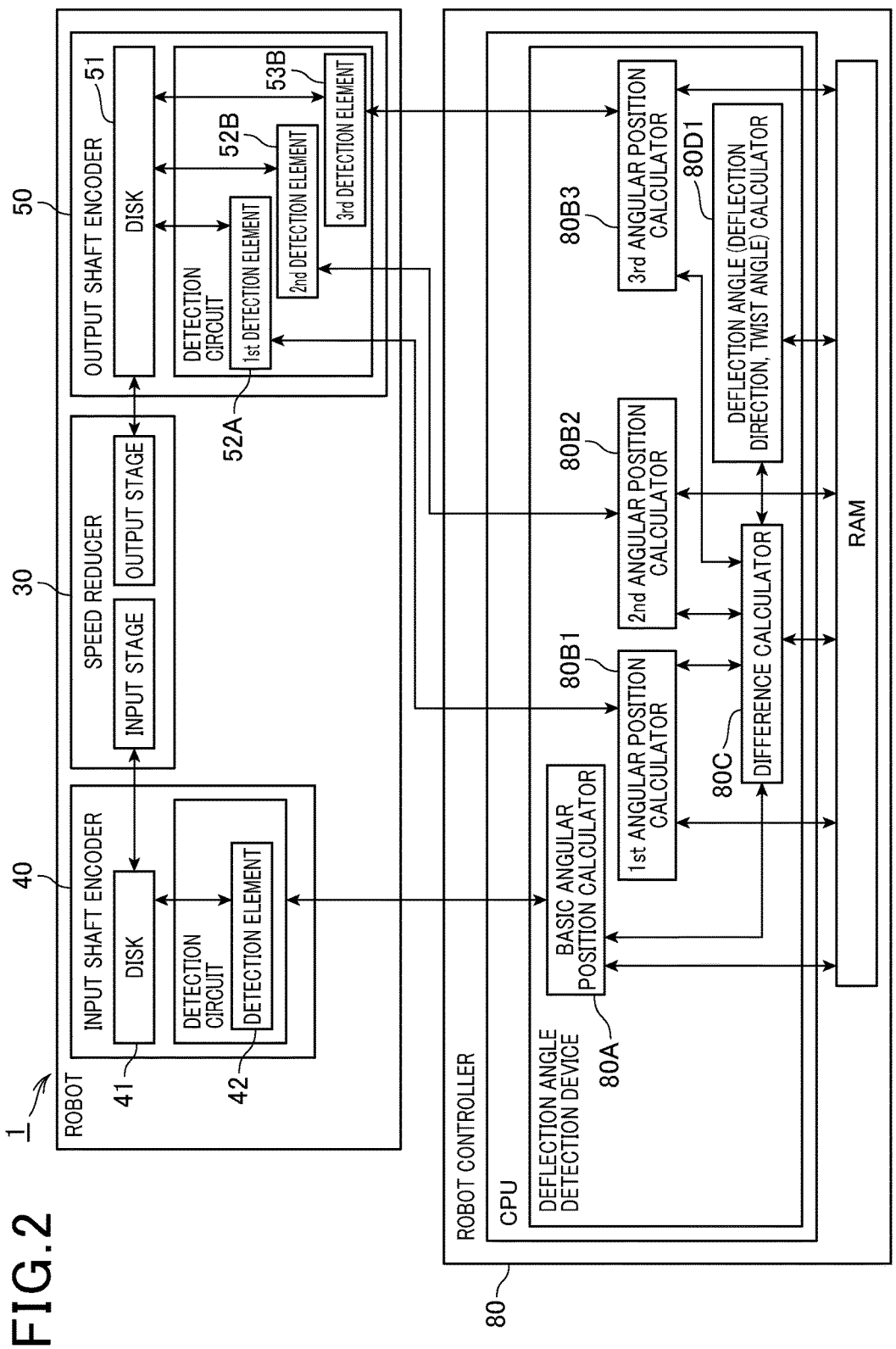
FIG. 2 shows a block diagram of the robot and the robot controller according to the first embodiment.

As shown in FIG. 1 and FIG. 2, an operation state of a joint 10 of a robot 1 is controlled by a robot controller 80.

The joint 10 includes a housing 11, a motor 20, a speed reducer 30, an input shaft encoder 40, an output shaft encoder 50, and the like.

The housing 11 is attached to a predetermined rotating shaft (a rotating shaft on a base end side; not shown) of the robot 1.

The motor 20 and the speed reducer 30 are fixed to the housing 11.

A drive shaft of the motor 20 is an input shaft 21 for inputting rotation to the speed reducer 30.

A driving state of the motor 20 is controlled by the robot controller 80.

The input shaft encoder 40 for detecting an angular position of the input shaft 21 is attached to the motor 20.

Note that the speed reducer 30 may be fixed to the motor 20.

The input shaft encoder 40 includes a disk 41, a detection element 42, and the like.

The disk 41 is concentrically attached to the input shaft 21.

The detection element 42 is attached to a casing of the input shaft encoder 40.

The detection element 42 is disposed so as to face a predetermined position of an outer peripheral edge portion of a detection surface of the disk 41.

The detecting element 42 detects ON/OFF signals corresponding to an angular position of the disk 41.

The ON/OFF signal (that is, the angular position) detected by the detection element 42 is inputted to the robot controller 80.

A transmissive optical encoder, a reflective optical encoder, a magnetic encoder, or the like can be adopted as the input shaft encoder 40.

The speed reducer 30 decelerates the rotation of the input shaft 21 at a predetermined reduction ratio and outputs it as the rotation of the output shaft 31.

A predetermined rotating shaft (a rotating shaft on a distal end side; not shown) of the robot 1 is attached to the output shaft 31.

A wave motion gear type speed reducer, a planetary gear type speed reducer or the like can be adopted as the speed reducer 30.

The output shaft encoder 50 for detecting an angular position of the output shaft 31 is attached to the housing 11 or the speed reducer 30.

The output shaft encoder 50 includes a disk 51, a plurality of detection elements 52 (a first detection element 52A, a second detection element 52B, a third detection element 52C), and the like.

The disk 51 is concentrically attached to the output shaft 31.

The plurality of detection elements 52 are attached to a casing of the output shaft encoder 50.

Each of the plurality of detection elements 52 is disposed so as to face respective predetermined position on an outer peripheral edge portion of a detection surface of the disk 51.

Each of the plurality of detection elements 52 detects ON/OFF signals corresponding to angular positions of the disk 51, respectively.

The ON/OFF signals (that is, the angular positions) detected by the plurality of detection elements 52 are inputted to the robot controller 80.

A transmissive optical encoder, a reflective optical encoder, a magnetic encoder, or the like can be adopted as the output shaft encoder 50.

Details of positions of the plurality of detection elements 52 will be described later.

The input shaft 21, the disk 41, the output shaft 31, and the disk 51 are concentrically disposed.

That is, center lines of the input shaft 21, the disk 41, the output shaft 31, and the disk 51 coincide with each other on an axis C1.

Here, a flow of calculation of a deflection angle, a deflection direction, and a twist angle of the output shaft 31 will be described with reference to FIG. 3.

Although not described in detail, the robot controller 80 is a microcomputer including a CPU, a ROM, a RAM, an input/output port, a driving circuit, and the like.

The robot controller 80 receives detection values from various sensors such as the input shaft encoder 40 and the output shaft encoder 50, and controls drive states of various actuators such as the motor 20.

Figure 3:
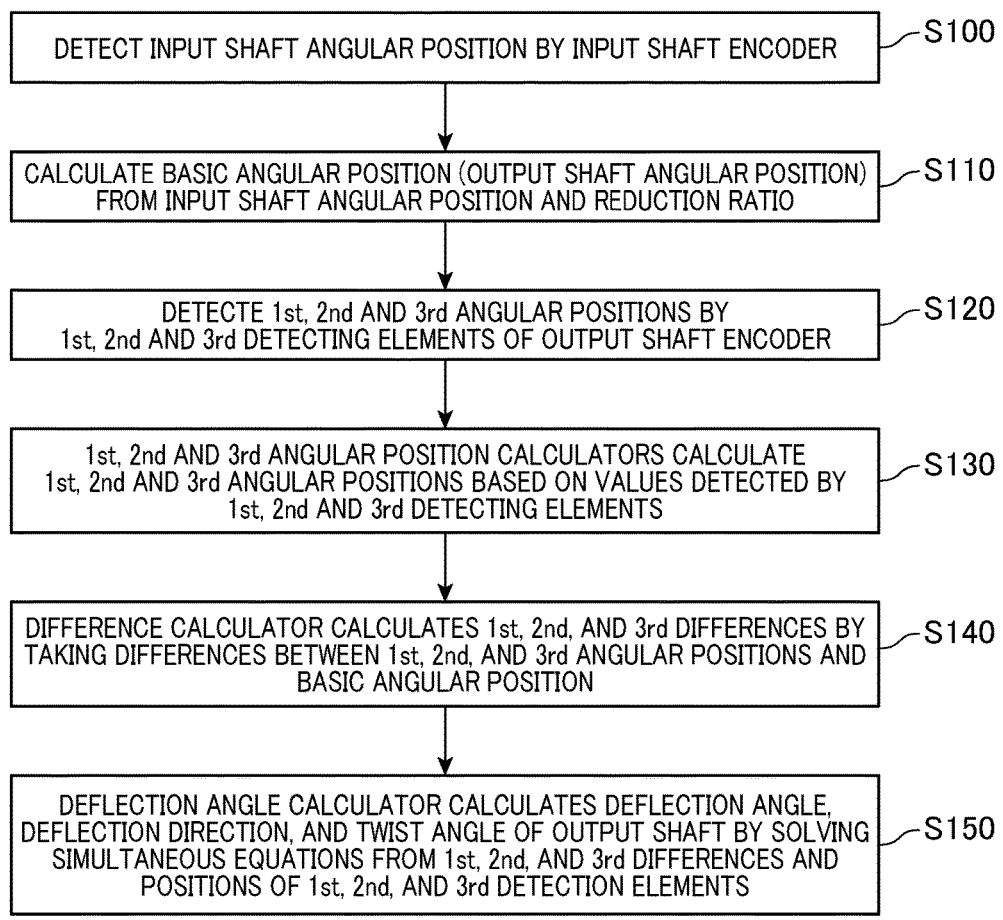
FIG. 3 shows a flowchart of calculation of a deflection angle, a deflection direction, and a twist angle of an output shaft according to the first embodiment.

The robot controller 80 calculates the angular position of the disk 41, that is, the input shaft 21 based on the ON/OFF signals detected by the detecting element 42 of the input shaft encoder 40 (S100 of FIG. 3. The same applies below).

Then, a basic angular position calculator 80A of the robot controller 80 calculates a basic angular position of the output shaft 31 based on the angular positions of the input shaft 21 and the reduction ratio of the speed reducer 30 (S110).

This basic angular position corresponds to an angular position of the output shaft 31 in a state where it is not affected by twist due to deflection and elastic deformation.

In addition, based on the ON/OFF signals detected by the plurality of detection elements 52 (the first, second, and third angular positions S120), a first angular position calculator 80B1, a second angular position calculator 80B2, and a third angular position calculator 80B3 of the robot controller 80 calculate the first, second, and third angular positions of the disk 51, that is, of the output shaft 31 (S130).

It should be noted that the input shaft encoder 40, the output shaft encoder 50, and the robot controller 80 constitute the deflection angle detection device.

Figure 4:
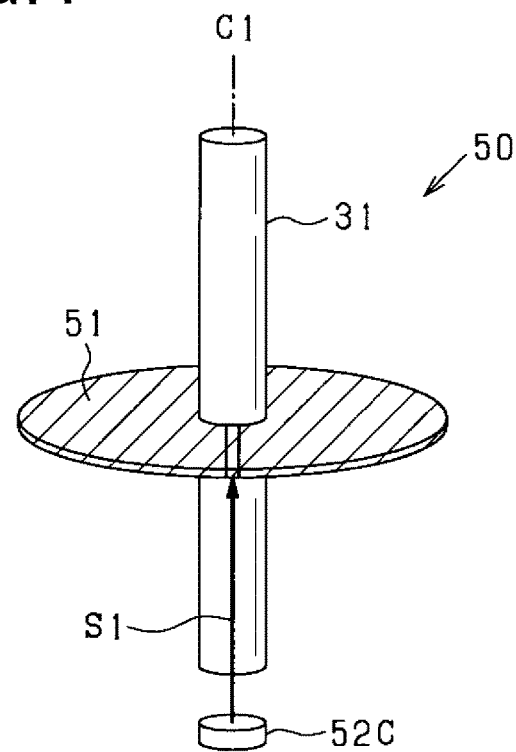
FIG. 4 shows a schematic diagram of a detected angular position in a state where the output shaft is not deflected.

FIG. 4 is a schematic diagram showing the angular position detected by the third detection element 52C in a state where the output shaft 31 is not deflected.

The third detection element 52C detects the ON/OFF signals corresponding to a position of the disk 51 indicated by an arrow S1.

Then, the angular position of the disk 51 is detected as an angular position corresponding to an angular position in a state where an angular position indicated by a double line is opposed to the third detection element 52C, that is, an angular position indicated by the double line.

Figure 5:
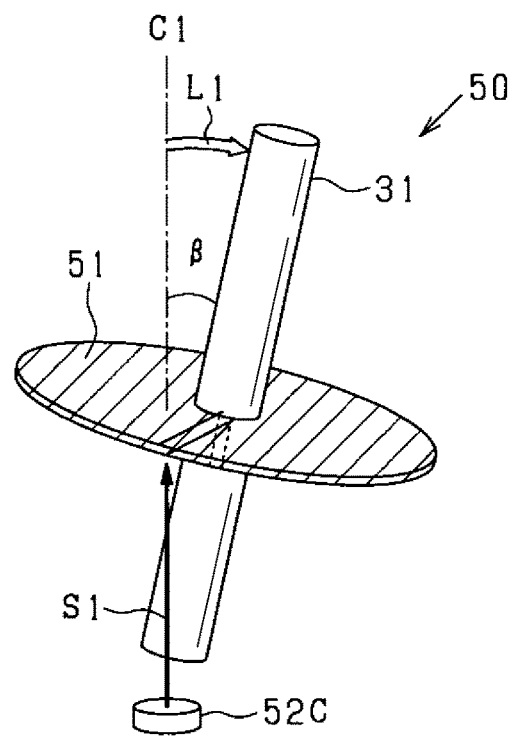
FIG. 5 shows a schematic diagram of a detected angular position in a state where the output shaft is deflected.

FIG. 5 is a schematic diagram showing the angular position detected by the third detection element 52C in a state where the output shaft 31 is deflected.

Here, a state in which the output shaft 31 deflects in a direction of an arrow L1 by a deflection angle $\beta$ will be described as an example.

Incidentally, in the following drawings including the present one, the deflection angle $\beta$ is exaggerated.

Similar to FIG. 4, the third detection element 52C detects the ON/OFF signals corresponding to the position of the disk 51 indicated by the arrow S1.

Then, the angular position of the disk 51 is detected as an angular position in a state where the angular position indicated by the solid double line is opposed to the third detection element 52C, that is, as an angular position corresponding to the angular position indicated by the solid double line.

Here, an angular position indicated by a dashed-double line is the angular position indicated by the double line in FIG. 4.

Therefore, the angular position of the disk 51 detected by the third detecting element 52C in the state where the output shaft 31 is not deflected and the angular position of the disk 51 detected by the third detecting element 52C in the state where the output shaft 31 is deflected will be deviated.

Figure 6:
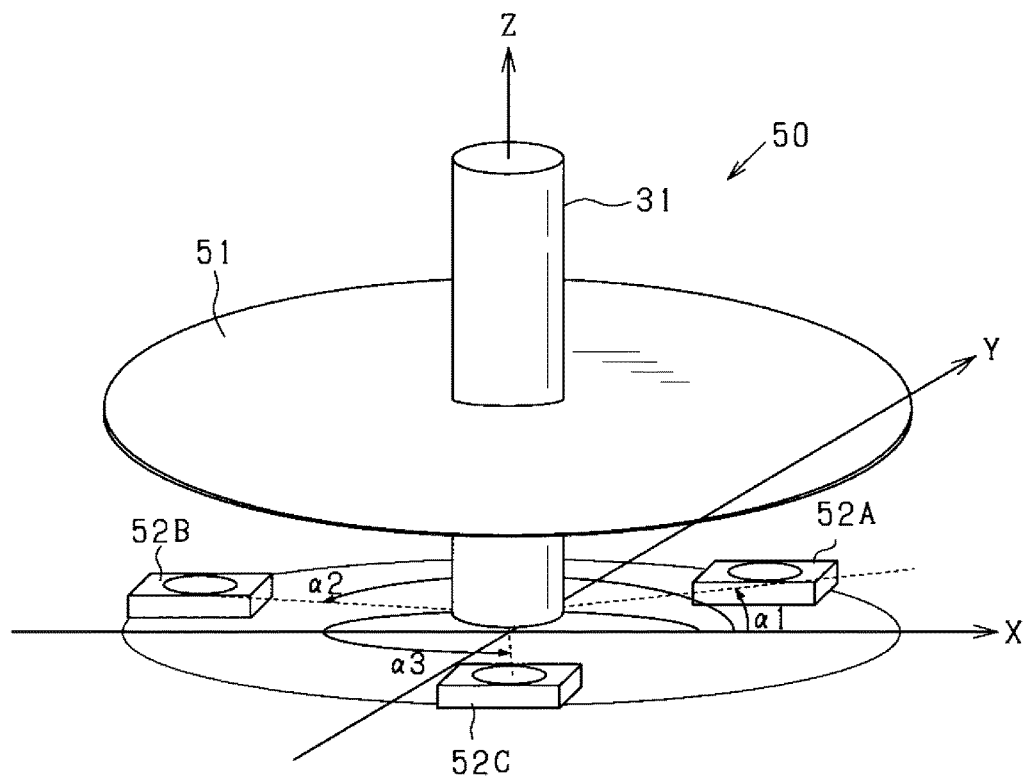
FIG. 6 shows a perspective view of positions of detection elements of an output shaft encoder.
Figure 7:
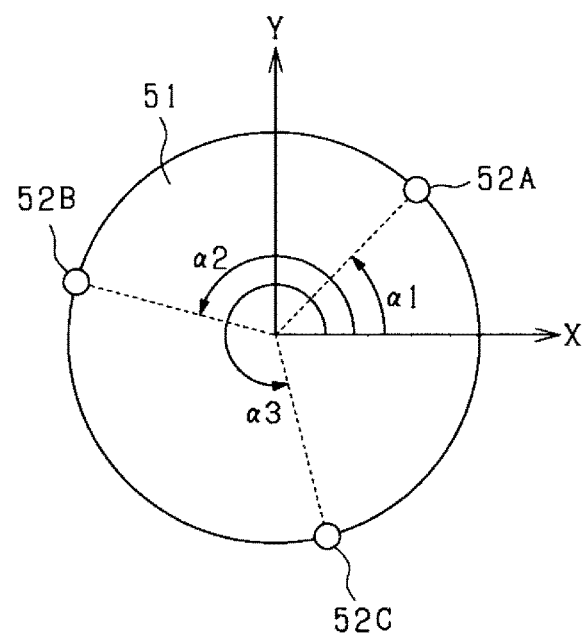
FIG. 7 shows a projection view of the positions of the detection elements of the output shaft encoder.

FIGS. 6 and 7 are a perspective view and a projection view, respectively, showing the positions of the plurality of detection elements 52 (the first detection element 52A, the second detection element 52B, and the third detection element 52C) of the output shaft encoder 50.

It will be described as an example in a state where the center line of the output shaft 31 coincides with a Z axis and a plane (corresponding to a predetermined plane) on which the plurality of detection elements 52 are disposed coincides with an XY plane.

FIG. 7 is a projection view of FIG. 6 in the Z axis direction.

The plane (XY plane) where the plurality of detection elements 52 are disposed and the detection surface of the disk 51 are parallel.

Each of the plurality of detection elements 52 is disposed so as to face a respective predetermined position on the outer peripheral edge portion of the detection surface of the disk 51.

Specifically, the first detection element 52A is disposed at a position of an angle $\alpha 1$, the second detection element 52B is disposed at a position of an angle $\alpha 2$, and the third detection element 52C is disposed at a position of an angle $\alpha 3$ counterclockwise with respect to the X axis.

The plurality of detection elements 52 are disposed at equal intervals along a circumferential direction of the disk 51, specifically at 120° intervals.

That is, $\alpha 3 - \alpha 2 = \alpha 2 - \alpha 1 = 120°$.

In this state, the angular position of the disk 51 is detected as angular positions corresponding to the angular positions indicated by the dashed-line at the positions of the angles $\alpha 1$, $\alpha 2$, and $\alpha 3$ by the plurality of detecting elements 52.

That is, the plurality of detection elements 52 are disposed at mutually different positions with respect to the disk 51 to detect angular positions of the disk 51, respectively.

Figure 8:
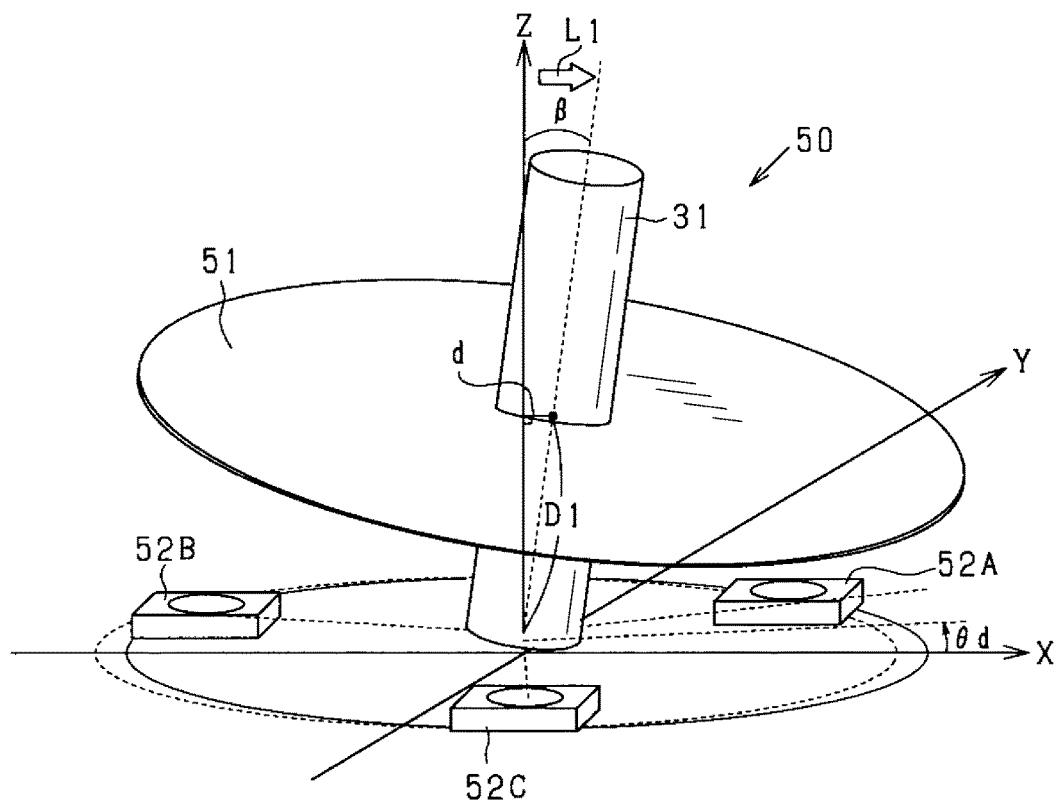
FIG. 8 shows a perspective view of the detection angular positions before and after the output shaft is deflected.
Figure 9:
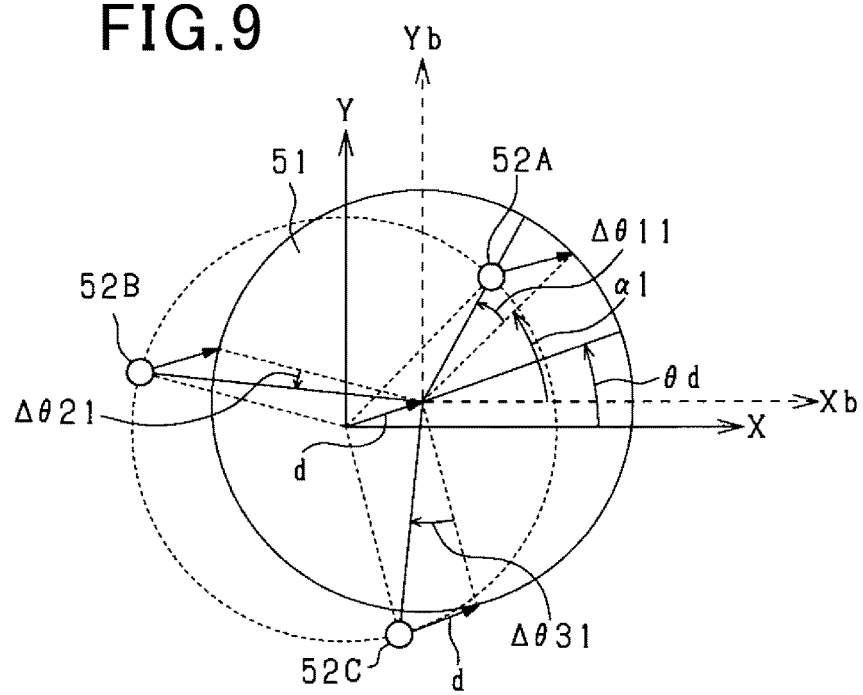
FIG. 9 shows a projection view of the detected angular positions before and after the output shaft is deflected.

FIGS. 8 and 9 are the perspective view and the projection view, respectively, showing angular positions respectively detected by the plurality of detection elements 52 before and after the output shaft 31 is deflected.

Here, an explanation will be given by exemplifying a state in which the output shaft 31 deflects in the direction of the arrow L1, that is, in the direction forming an angle $\theta d$ with the X axis.

In the XY plane in FIG. 9, that is, the projection plane of FIG. 8 in the Z axis direction, an amount of displacement of a center of the disk 51 (an origin of coordinates) in the direction of the angle $\theta d$ is defined as a deflection amount d of the output shaft 31.

The X and Y axes are respectively moved to Xb and Yb axes.

A state before the output shaft 31 is deflected is indicated by a dashed-line and a state after the output shaft 31 is deflected is indicated by a solid line.

As shown in FIG. 9, the disk 51 moves from a circle indicated by the dashed-line to a circle indicated by the solid line.

At this time, each of the angular positions (each radius indicated by dashed-lines in the dashed-line circle) detected by the plurality of detection elements 52 before the output shaft 31 is deflected is translated by the deflection amount d and is moved to angular positions indicated by dashed-lines in the solid circle, respectively.

On the other hand, since the plurality of detection elements 52 are attached to the casing of the output shaft encoder 50, they do not move even if the output shaft 31 deflects.

For this reason, the angular positions detected by the plurality of detecting elements 52 before the output shaft 31 is deflected and the angular positions detected by the plurality of detecting elements 52 after the output shaft 31 is deflected are deviated from each other.

After the output shaft 31 is deflected, angular positions corresponding to the plurality of detection elements 52 in this state, that is, angular positions corresponding to angular positions of each radius indicated by a solid line in the solid circle are detected by the plurality of detection elements 52, respectively.

Therefore, deviations of angles $\Delta\theta 11$, $\Delta\theta 21$, and $\Delta\theta 31$ will occur between the first, second, and third angular positions of the output shaft 31 calculated based on the ON/OFF signals detected by the plurality of detecting elements 52 before the output shaft 31 deflects and the first, second, and third angular positions of the output shaft 31 calculated based on the ON/OFF signals detected by the plurality of detecting elements 52 after the output shaft 31 deflects.

Figure 10:
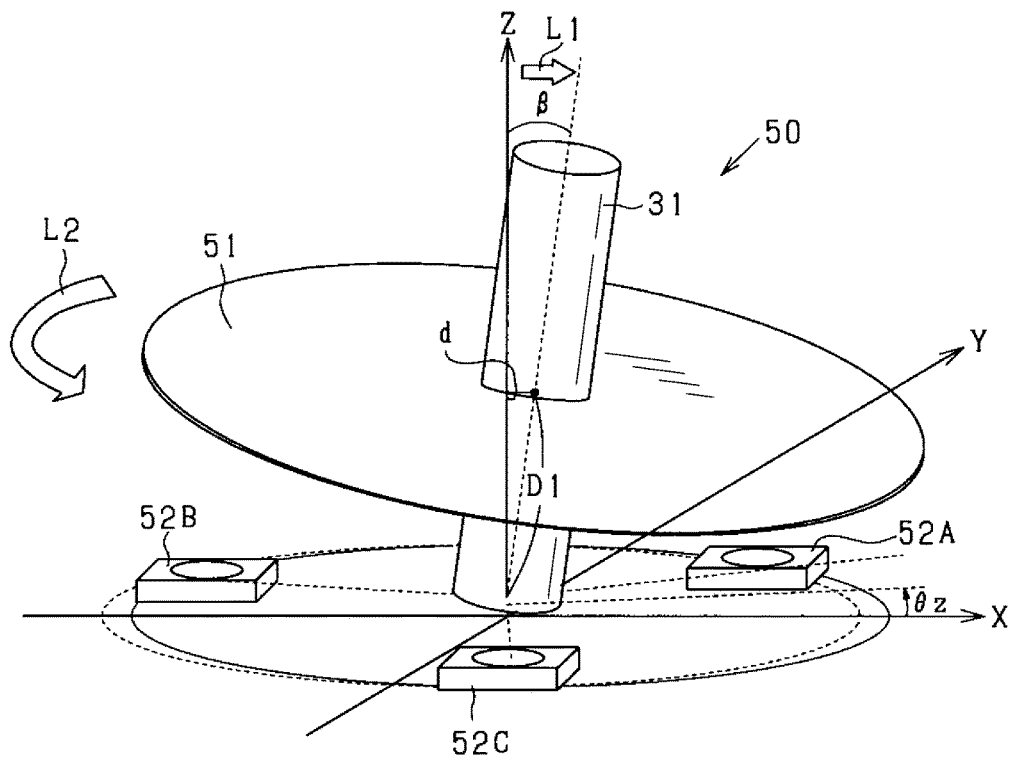
FIG. 10 shows a perspective view of the detected angular positions before and after the output shaft is deflected and twisted.
Figure 11:
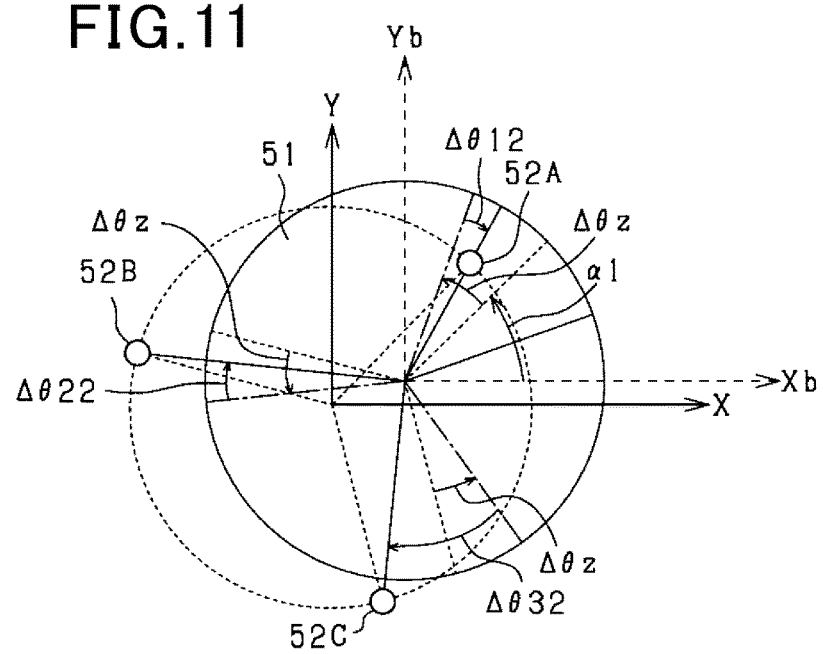
FIG. 11 shows a projection view of the detected angular positions before and after the output shaft is deflected and twisted.

FIGS. 10 and 11 are the perspective view and the projection view, respectively, showing the angular positions respectively detected by the plurality of detection elements 52 before and after the output shaft 31 is deflected and twisted.

Here, a state where the output shaft 31 is further twisted counterclockwise by the twist angle $\Delta\theta z$ counterclockwise from the state of FIGS. 8 and 7 due to elastic deformation as shown by an arrow L2 will be described as an example.

A state before the output shaft 31 is deflected or twisted is indicated by a dashed-line, and a state after the output shaft 31 is deflected and twisted is indicated by a solid line.

As shown in FIG. 11, the disk 51 moves from a circle indicated by the dashed-line to a circle indicated by the solid line.

At this time, the angular positions (each radius indicated by the dashed-line in the dashed-line circle) respectively detected by the plurality of detection elements 52 before the output shaft 31 is deflected or twisted translates by the deflection amount d and rotates by the twist angle $\Delta\theta z$, and the angular positions move to angular positions indicated by a one-dot chain line on the solid circle, respectively.

In contrast, since the plurality of detection elements 52 are attached to the casing of the output shaft encoder 50, they do not move even if the output shaft 31 is deflected or twisted.

For this reason, the angular positions detected by the plurality of detecting elements 52 before the output shaft 31 is deflected or twisted and the angular positions detected by the plurality of detecting elements 52 after the output shaft 31 is deflected and twisted are deviated from each other.

After the output shaft 31 is deflected and twisted, angular positions corresponding to the plurality of detection elements 52 in this state, that is, angular positions corresponding to angular positions of each radius indicated by a solid line in the solid circle is detected by the plurality of detection elements 52, respectively.

Therefore, deviations of angles $\Delta\theta 12$, $\Delta\theta 22$, and $\Delta\theta 32$ will occur between the first, second, and third angular positions of the output shaft 31 calculated based on the ON/OFF signals detected by the plurality of detecting elements 52 before the output shaft 31 deflects or twist, and the first, second, and third angular positions of the output shaft 31 calculated based on the ON/OFF signals detected by the plurality of detecting elements 52 after the output shaft 31 deflects and twists.

Figure 12:
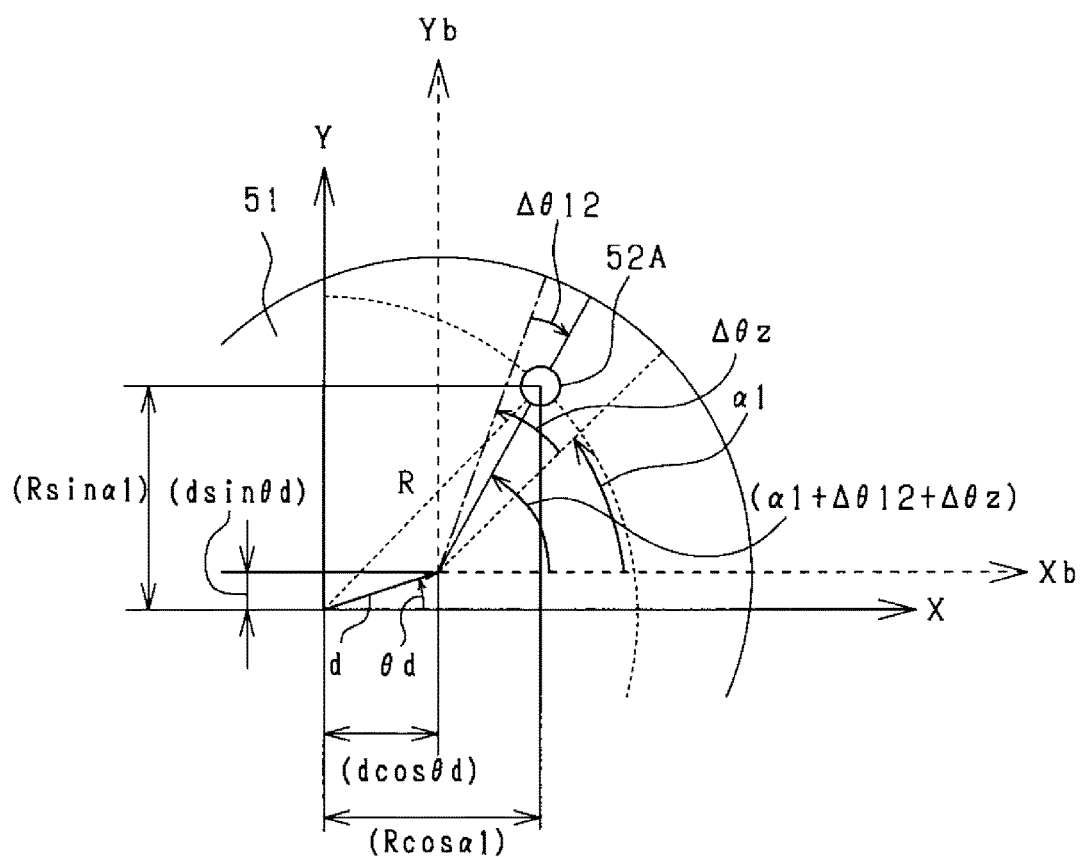
FIG. 12 shows a projection view of a relationship between the deflection direction, a deflection amount, and a twist angle in the first embodiment.

FIG. 12 is a projection view showing a relationship between the deflection direction (angle $\theta d$), the deflection amount d, and the twist angle $\Delta\theta z$.

Here, paying attention to the first detection element 52A in FIG. 11, the following relational expression is established.

R is the distance from the center of the disk 51 (output shaft 31) to the first detection element 52A in the projected view of FIG. 12.

That is, $\tan(\alpha 1+\Delta\theta 12+\Delta\theta z)=(R \sin \alpha 1-d \sin \theta d)/(R \cos \alpha 1-d \cos \theta d)$ is established.

Similarly, to the second detection element 52B and the third detection element 52C, $\tan(\alpha 2+\Delta\theta 22+\Delta\theta z)=(R \sin \alpha 2-d \sin \theta d)/(R \cos \alpha 2-d \cos \theta d)$ and $\tan(\alpha 3+\Delta\theta 32+\Delta\theta z)=(R \sin \alpha 3-d \sin \theta d)/(R \cos \alpha 3-D \cos \theta d)$ are established.

Then, by solving these three relational expressions as simultaneous equations, the angle $\theta d$, the deflection amount d, and the twist angle $\Delta\theta z$ can be obtained.

Further, since the distance D1 from the origin to the center of the disk 51 is known from the position shown in FIG. 8, if the deflection amount d is obtained, the deflection angle $\beta$ can be obtained.

That is, the relational expression $\sin \beta = d/D1$ is established.

It should be appreciated that in the above relational expressions, since projection onto a predetermined plane is used, approximate calculation is included.

However, since the deflection angle $\beta$ is a very small angle, an error due to the approximate calculation is very small, and an effect of reducing calculation load by using the approximate calculation is dominant.

As described above, the basic angular position of the output shaft 31 calculated based on the ON/OFF signals detected by the detecting elements 42 of the input shaft encoder 40 corresponds to an angular position of the output shaft 31 in a state where it is not affected by the twist due to the deflection and the elastic deformation.

Therefore, the basic angular position can be used as an angular position corresponding to the first, second, and third angular positions of the output shaft 31 calculated based on the ON/OFF signals detected by the plurality of detection elements 52 before the output shaft 31 deflects or twists.

Then, the difference calculator 80C of the robot controller 80 calculates a first difference which is a difference between the basic angular position and the first angular position calculated based on the angular position detected by the first detecting element 52A (S140).

Similarly, the robot controller 80 calculates a second difference which is a difference between the basic angular position and the second angular position calculated based on the angular position detected by the second detecting element 52B, and a third difference which is a difference between the basic angular position and the third angular position calculated based on the angular position detected by the third detecting element 52C (S140).

The first difference, the second difference, and the third difference correspond to the angles $\Delta\theta 12$, $\Delta\theta 22$, and $\Delta\theta 32$, respectively.

Therefore, a deflection angle (a deflection direction, a twist angle) calculator 80D1 of the robot controller 80 calculates the deflection direction angle $\theta d$, the deflection angle $\beta$, and the twist angle $\Delta\theta z$ according to the above relational expression (S150).

It should be noted that with the angles $\alpha 1$, $\alpha 2$, $\alpha 3$ representing the position of each of the plurality of detection elements 52 with respect to the disk 51 as a reference, the first angular position, the second angular position, and the third angular position may be calculated as angular positions from the reference.

Incidentally, a difference which is a difference between the basic angular position and each angular position calculated based on the angular position detected by each detecting element 52 is calculated, and based on the difference, the deflection angle, the deflection direction, and twist angle are calculated (S130 to S150 in FIG. 3) in the above-described embodiment.

Figure 13:
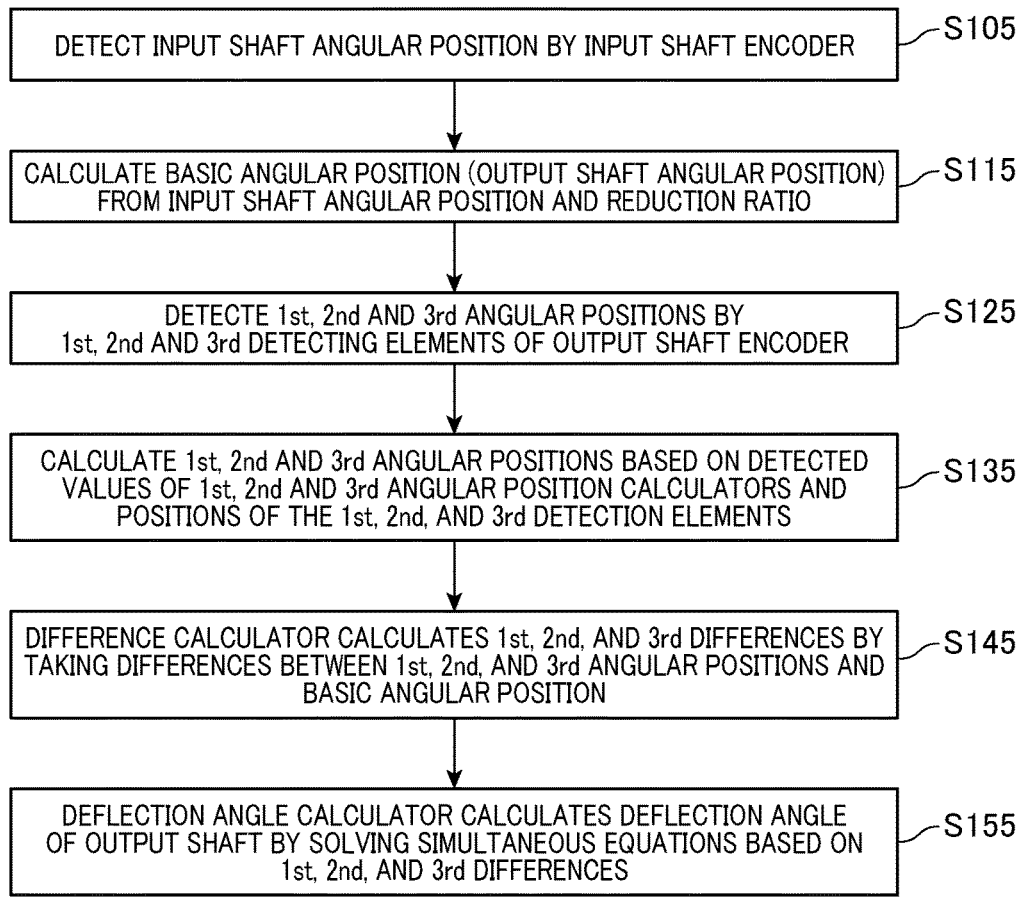
FIG. 13 shows a flowchart of a calculation of a deflection angle of an output shaft according to a modified example of the first embodiment.

However, as in a modified example shown in FIG. 13, a difference which is a difference between the basic angular position, each angular position detected by each detecting element 52 and each angular position calculated based on the positions of the detecting elements 52 is calculated, and based on the difference, the deflection angle may be calculated (S135 to S155 in FIG. 13).

In addition, the robot controller 80 (corresponding to a first controller) calculates the deflection angle β of the output shaft 31 by controlling the robot 1 in a predetermined posture in a calibration of the robot 1.

That is, the deflection angle β of the output shaft 31 is calculated in a state where no abnormal external force is acting on the robot 1.

Then, the robot controller 80 (corresponding to a second controller) calculates the deflection angle β of the output shaft 31 by controlling the robot 1 to the predetermined attitude during an operation of the robot 1.

In other words, the deflection angle β of the output shaft 31 is calculated during an operation that may have abnormal external force acting on the robot 1.

At this time, if the abnormal external force is acting on the robot 1, the deflection angle β changes as the output shaft 31 deflects.

The robot controller 80 (corresponding to a determiner) determines that the abnormal external force is acting on the robot 1 when a deviation between the deflection angle β of the output shaft 31 calculated in the calibration of the robot 1 and the deflection angle β of the output shaft 31 calculated during the operation of the robot 1 is equal to or larger than the predetermined deviation.

Therefore, it can be determined that the abnormal external force is acting on the robot 1 by using the detected deflection angle β of the output shaft 31.

Figure 14:
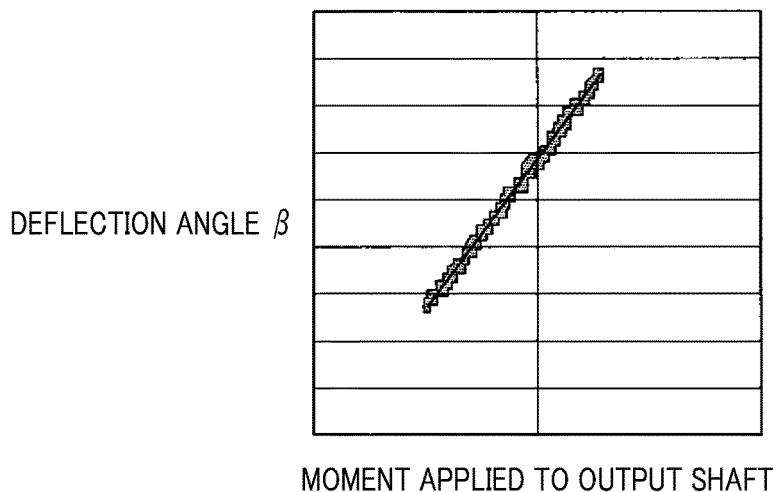
FIG. 14 shows a graph of a relationship between a moment applied to the output shaft and the deflection angle.

Further, as shown in FIG. 14, a flexural rigidity of the output shaft 31 can be calculated by calculating the deflection angle β by changing a moment in the deflection direction applied to the output shaft 31.

That is, the flexural rigidity is a reciprocal of an inclination a of the deflection angle β with respect to the moment applied to the output shaft 31.

Further, the robot controller 80 may calculate a load torque acting on the output shaft 31 based on the twist angle Δθz.

Furthermore, the robot controller 80 may precisely control a tip position of an arm of the robot 1 based on the calculated angle θd, the deflection angle β, and the twist angle Δθz.

The present embodiment described in detail above has the following advantages.

(i) When the output shaft 31 is deflected and tilted or the output shaft 31 is twisted by elastic deformation, the relative position between the disk 51 attached to the output shaft 31 and the plurality of detection elements 52 for detecting the angular position of the disk 51 changes.

The plurality of detection elements 52 are disposed at different positions with respect to the disk 51.

Therefore, the first difference, the second difference, and the third difference calculated become different from each other when the disk 51 attached to the output shaft 31 is tilted due to deflection of the output shaft 31.

These first, second, third differences and the positions of the plurality of detection elements 52 with respect to the disk 51, the deflection angle β of the output shaft 31, the deflection direction (angle θd), and the twist angle Δθz due to elastic deformation have a correlation, and a relational expression is established between them.

The positions of the plurality of detection elements 52 with respect to the disk 51 are known, and the number of the calculated differences, that is, the number of the relational expressions that are established is equal to or more than unknown state quantities (a deflection angle β, a deflection direction, and a twist angle Δθz due to elastic deformation).

Therefore, the deflection angle β of the output shaft 31 can be calculated based on the calculated first difference, the second difference, the third difference, and the positions of the plurality of detection elements 52 with respect to the disk 51.

(ii) The deflection angle β of the output shaft 31 can be detected based on the angular positions detected by the detection element 42 of the input shaft encoder 40 and the plurality (three) of detection elements 52 of the output shaft encoder 50 only by increasing the number of detection elements of the output shaft encoder 50 even when the external force is acting on the output shaft 31.

Therefore, it is possible to accurately detect the deflection angle β while suppressing the existing configuration from changing.

(iii) The deflection direction (angle θd) of the output shaft 31 may be calculated based on the calculated first difference, the second difference, the third difference, and the positions of the plurality of detection elements 52 with respect to the disk 51.

(iv) The twist angle Δθz due to the elastic deformation of the output shaft 31 may be calculated based on the calculated first difference, the second difference, the third difference, and the positions of the plurality of detection elements 52 with respect to the disk 51.

(v) The plurality of detection elements 52 are disposed at equal intervals along the circumferential direction of the disk 51.

Therefore, it is possible to suppress the plurality of detection elements 52 from being strongly affected only by a deflection in a specific direction.

As a result, a state quantity of the output shaft 31 can be accurately detected regardless of the deflection direction of the output shaft 31.

It should be noted that the deflection angle β, the deflection direction (angle θd), and the twist angle Δθz of the output shaft 31 may be calculated even when the plurality of detecting elements 52 are not disposed at equal intervals along the circumferential direction of the disk 51.

Second Embodiment

Hereinafter, a second embodiment will be described focusing on differences from the first embodiment.

It should be appreciated that, in the second embodiment and the subsequent embodiments, components identical with or similar to those in the first embodiment are given the same reference numerals, unless otherwise indicated, and repeated structures and features thereof will not be described in order to avoid redundant explanation.

Figure 15:
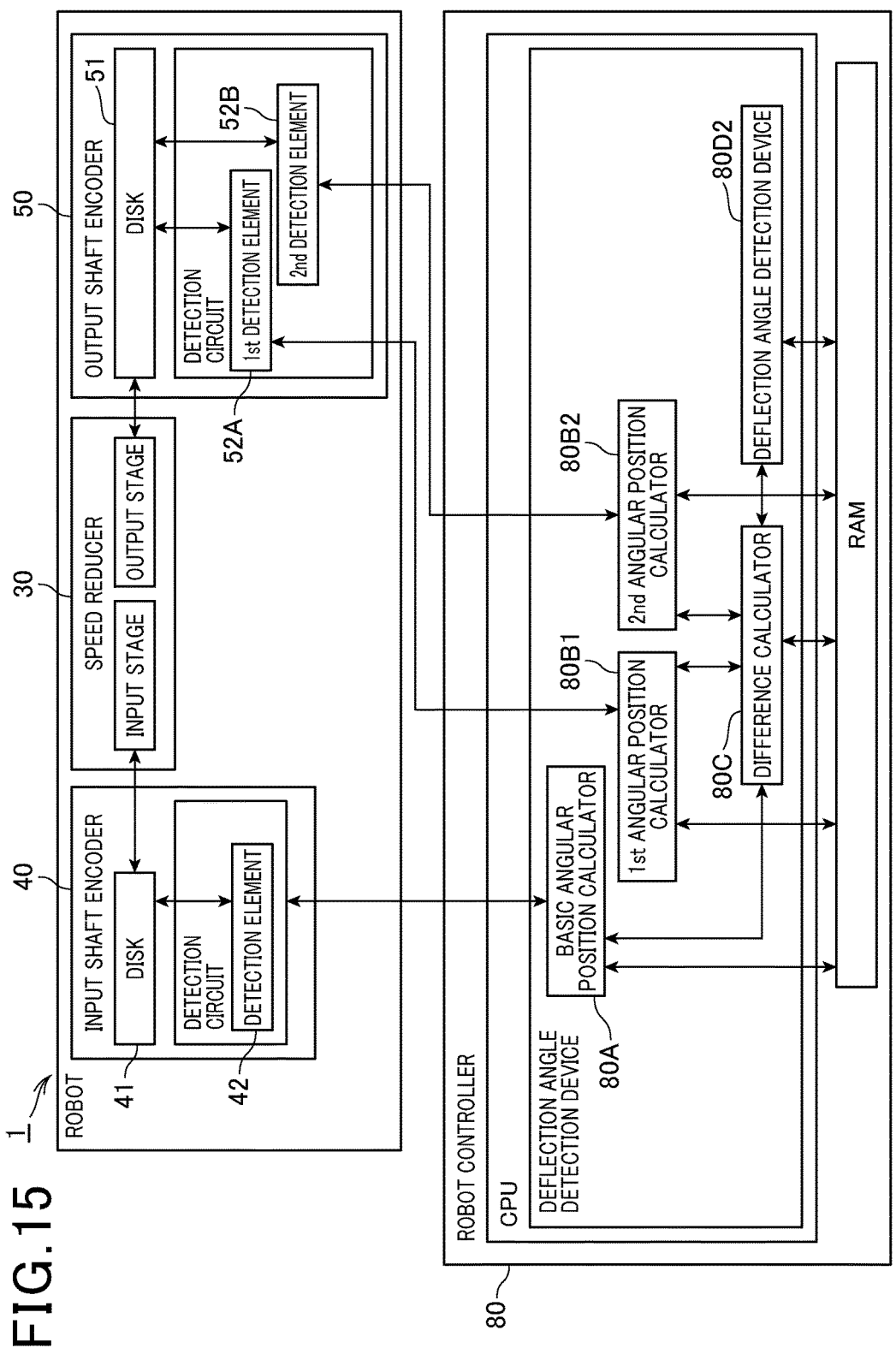
FIG. 15 shows a block diagram of a robot and a robot controller according to a second embodiment.
Figure 16:
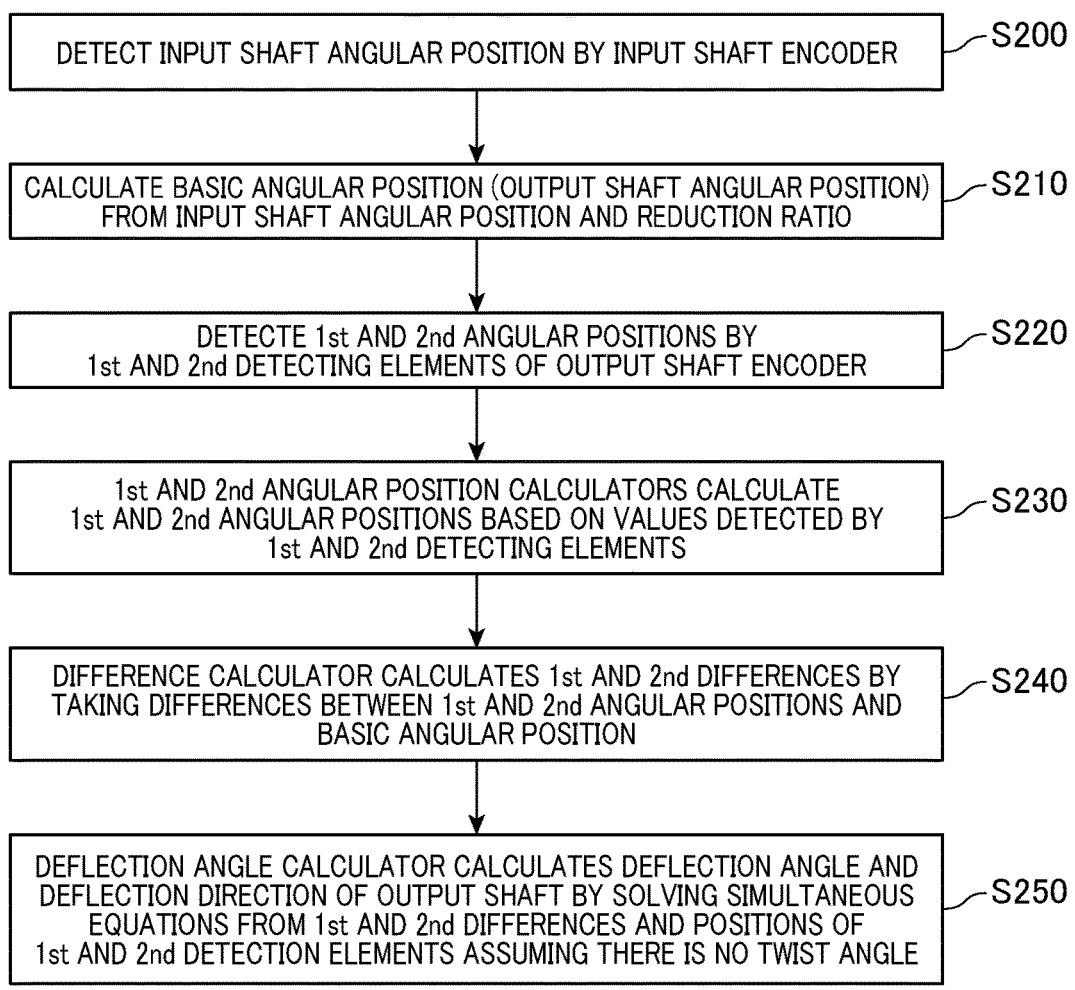
FIG. 16 shows a flowchart of a calculation of a deflection angle and a deflection direction of an output shaft according to the second embodiment.

FIG. 15 is a block diagram of a robot and a robot controller according to the second embodiment, and FIG. 16 is a diagram showing a flow of calculation of a deflection angle and a deflection direction of an output shaft.

Note that in FIGS. 16, S200 and S210 have the same contents as S100 and S110 in the first embodiment.

In the present embodiment, the third detection element 52C used in the first embodiment is omitted.

It should be noted that instead of the third detection element 52C, the first detection element 52A or the second detection element 52B in the first embodiment may be omitted.

Here, a twist due to the elastic deformation of the output shaft 31 is unlikely to occur unless an external force acts in a direction of twisting the output shaft 31.

Further, an influence of twisting due to the elastic deformation of the output shaft 31 may be removed in advance by correction.

Furthermore, an amount of twist may be applied to an equation as a constant.

Therefore, it is assumed that there is no influence of twist due to elastic deformation of the output shaft 31 in the present embodiment.

Figure 17:
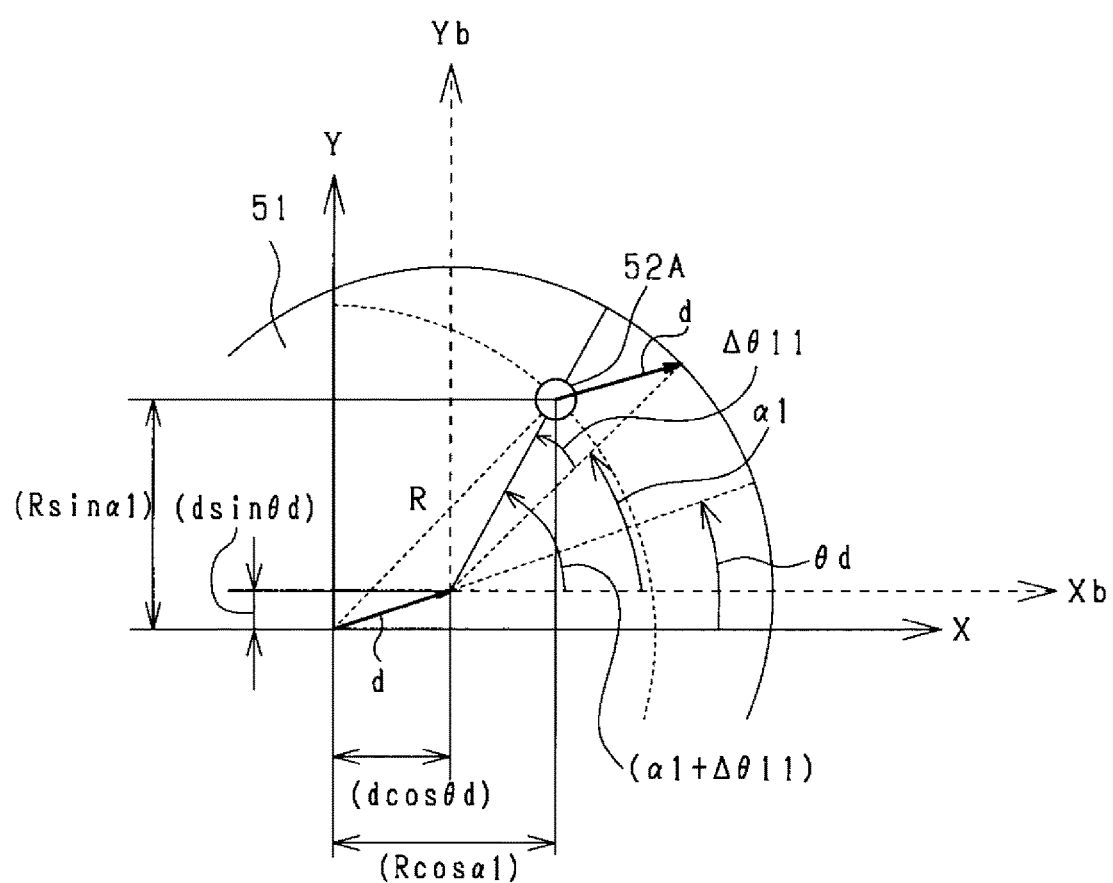
FIG. 17 shows a projection view of a relationship between a deflection direction and a deflection amount in the second embodiment.

FIG. 17 is a projection view showing a relationship between a deflection direction (angle θd) and a deflection amount d.

Here, paying attention to the first detection element 52A in FIG. 9, the following relational expression is established.

That is, $\tan(\alpha 1 + \Delta\theta 11) = (R \sin \alpha 1 - d \sin \theta d)/(R \cos \alpha 1 - d \cos \theta d)$ is established.

Similarly, $\tan(\alpha 2 + \Delta\theta 21) = (R \sin \alpha 2 - d \sin \theta d)/(R \cos \alpha 2 - d \cos \theta d)$ for the second detection element 52B is also established.

Then, the angle θd and the deflection amount d can be obtained by solving these two relational expressions as simultaneous equations.

As described above, if the deflection amount d is found, the deflection angle β can be obtained.

Then, the difference calculator 80C of the robot controller 80 calculates a first difference (S240) which is a difference between the basic angular position and a first angular position calculated based on the angular position (S230) detected by the first detecting element 52A (S220).

Similarly, the robot controller 80 calculates a second difference (S240) which is a difference between the basic angular position and a second angular position calculated based on the angular position (S230) detected by the second detecting element 52B (S220).

The first difference and the second difference correspond to the angles Δθ11 and Δθ21, respectively.

Therefore, a deflection angle (a deflection direction) calculator 80D2 of the robot controller 80 calculates the direction angle θd and the deflection angle β according to the above-mentioned relational expression (S250).

The present embodiment has the following advantages. Here, only the differences from the first embodiment will be described.

(vi) Assuming that there is no influence of twist due to elastic deformation of the output shaft 31, the positions of the first detection element 52A and the second detection element 52B with respect to the disk 51 are known, and the number of the calculated differences (the first difference, the second difference), that is, the number of the relational expressions established is equal to or more than unknown state quantities (a deflection angle β, an angle θd).

Therefore, on the assumption that there is no influence of twist due to elastic deformation of the output shaft 31, the deflection angle β of the output shaft 31 can be calculated based on the calculated first difference, the second difference, and the positions of the first detection element 52A and the second detection element 52B with respect to the disk 51.

(vii) The deflection angle β of the output shaft 31 can be detected based on the angular positions detected by the detection element 42 of the input shaft encoder 40 and the two detection elements 52A and 52B of the output shaft encoder 50 only by increasing the number of detection elements of the output shaft encoder 50 even when the external force is acting on the output shaft 31.

Therefore, it is possible to accurately detect the deflection angle β while suppressing the existing configuration from changing.

(viii) The deflection direction (angle θd) of the output shaft 31 may be calculated based on the calculated first difference, the second difference, and the positions of the first detection element 52A and the second detection element 52B with respect to the disk 51.

Third Embodiment

Hereinafter, a third embodiment will be described focusing on differences from the second embodiment.

Figure 18:
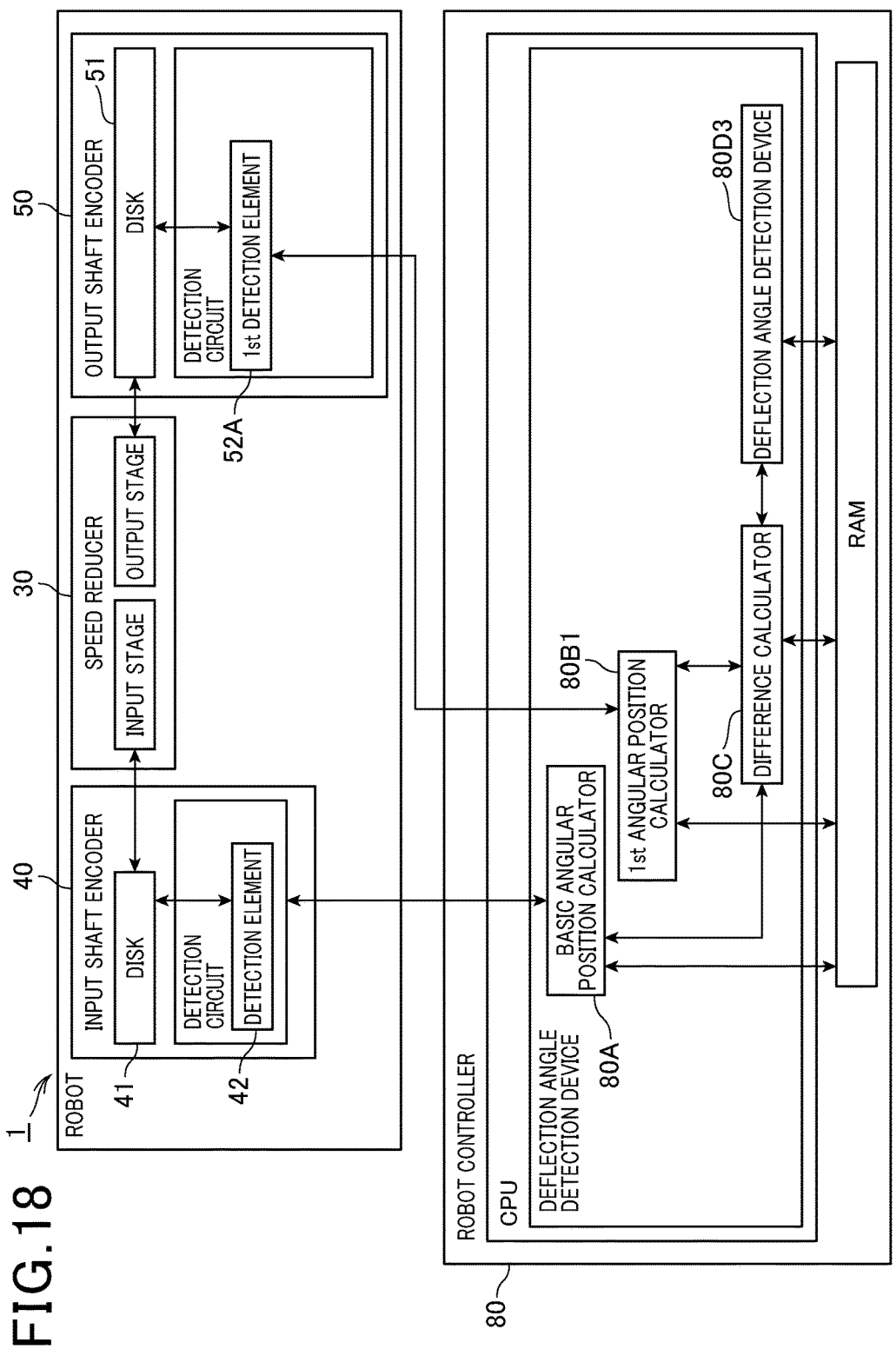
FIG. 18 shows a block diagram of a robot and a robot controller according to a third embodiment.

FIG. 18 is a block diagram of a robot and a robot controller according to the third embodiment, and FIG. 19 is a diagram showing a flow of calculation of the deflection angle of an output shaft.

Note that in FIGS. 19, S300 and S310 have the same contents as S100 and S110 in the first embodiment.

In the present embodiment, the second detection element 52B used in the first embodiment is further omitted.

It should be noted that instead of the second detection element 52B and the third detection element 52C, the first detection element 52A, the second detection element 52B, or the first detection element 52A and the third detection element 52C in the first embodiment may be omitted.

FIG. 20 is a projection view showing a positional relationship between an output shaft 31 and a first detection element 52A.

Here, centers of gravity of arms of a robot 1 are shown as centers of gravity W1, W2, W3 in order of long distance away from an origin in an X axis direction.

As shown in the drawing, as the center of gravity of the arm of the robot 1 moves away from the origin in the X axis direction, a deflection amount d (a deflection angle β) of the output shaft 31 in the X axis direction increases.

The output shaft 31 is easy to deflect along a plane (a plane perpendicular to a Y axis and including the X axis in a state shown in the drawing) including a longitudinal direction of a predetermined member (a portion on a distal end side of the output shaft 31 of the arm) that rotates integrally with the output shaft 31 and an axial direction of the output shaft 31.

It should be noted that the arm is a heavy object for the shaft (output shaft), and the shaft is deflected in a direction to be pulled by the heavy object, that is, the pulling direction which is a direction in which the arm exists (extends).

The direction in which the arm exists can be calculated from the current command value, the detection value of the input shaft encoder, etc. without relying on the above calculation formula.

Therefore, it is possible to correct the control of the arm (the input shaft of the speed reducer) by eliminating the deflection direction from the above calculation formula and using the deflection direction obtained from the command value and the detection value of the input shaft encoder.

As described above, when the output shaft 31 deflects, the relative position between the disk 51 of the output shaft encoder 50 and the first detection element 52A, that is, the deflection angle β changes.

The deflection angle β calculated based on the angular position detected by the first detection element 52A becomes the largest value when the deflection direction of the output shaft 31 and the direction from the output shaft 31 to the first detection element 52A are perpendicular (an input angle θm=) 0°, as shown in FIG. 20.

Then, as the input angle θm approaches 90°, the deflection angle β calculated when deflected along the plane including the longitudinal direction of the predetermined member and the axial direction of the output shaft 31 becomes smaller, and the deflection angle β calculated by the input angle θm=90° becomes 0°.

Figure 21:
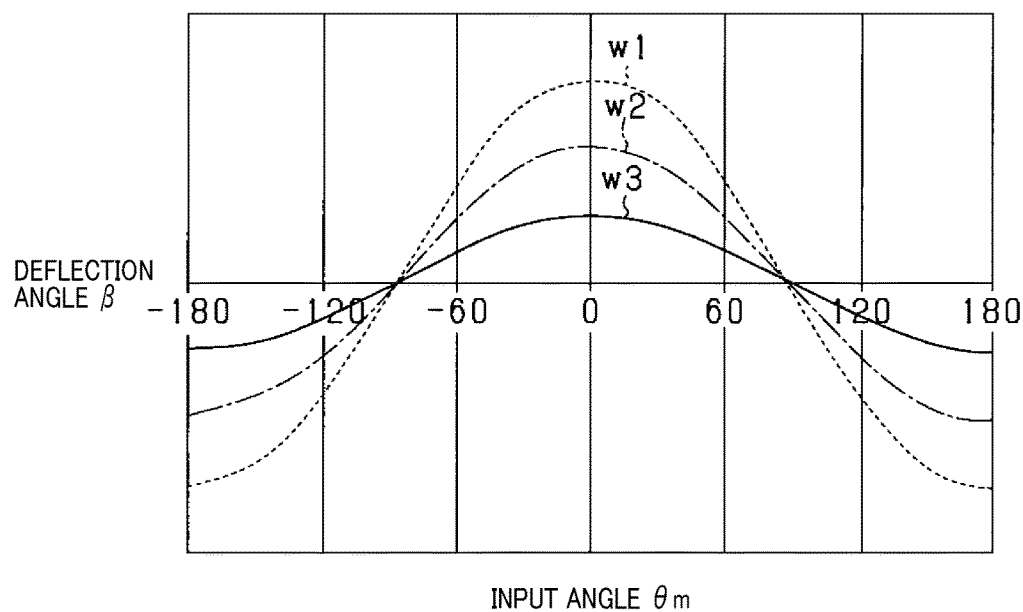
FIG. 21 shows a graph of a relationship between a center of gravity of an arm, an input angle, and the deflection angle.

Accordingly, the relationship between the centers of gravity W1, W2, W3 of the arm, the input angle θm, and the deflection angle β becomes as shown in the graph in FIG. 21. The calculated deflection angle β corresponds to a deflection angle component βx of the output shaft 31 with respect to the X axis direction.

Here, considering only a deflection angle component βm of the output shaft 31 with respect to the predetermined direction, it is equal to fix the angle θd (deflection direction) of the output shaft 31.

Therefore, the deflection amount d can be obtained from tan(α1+Δθ11)=(R sin α1−d sin θd)/(R cos α1−d cos θd).

As described above, if the deflection amount d is obtained, the deflection angle component βm can be obtained.

Then, the difference calculator 80C of the robot controller 80 calculates a first difference (S340) which is a difference between the basic angular position and a first angular position calculated based on the angular position (S330) detected by the first detecting element 52A (S320).

The first difference corresponds to the angle Δθ11.

Therefore, to deflection angle calculator 80D3 of the robot controller 80 calculates the deflection angle component βm according to the above-mentioned relational expression (S350).

Further, the disk 51 of the output shaft encoder 50 is attached to the casing of the output shaft encoder 50, that is, the housing 11 (corresponding to a first predetermined member) that fixes the speed reducer 30 in the present embodiment.

Figure 22:
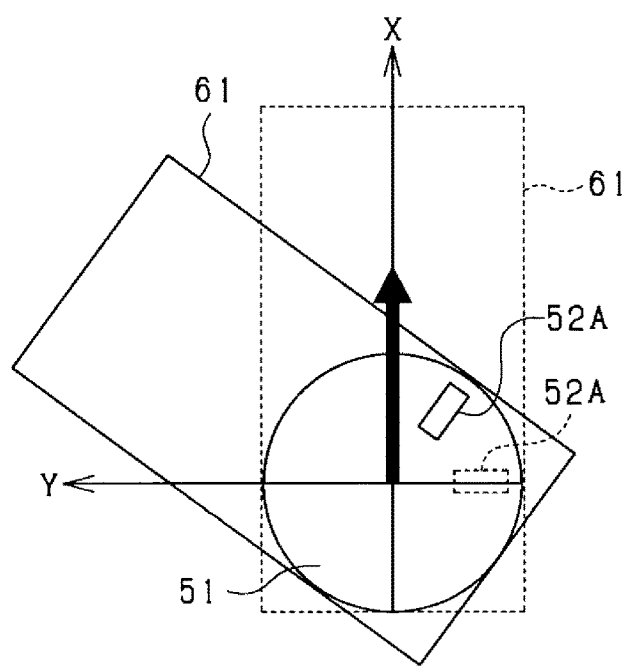
FIG. 22 shows a projection view of a longitudinal direction of a predetermined member, a position of a disk and the detection element.

Furthermore, the first detection element 52A is attached to a predetermined member 61 (corresponding to a second predetermined member) that rotates integrally with the output shaft 31 as shown in FIG. 22.

Then, the first detection element 52 the first detection element 52A is attached to the predetermined member 61 in such a manner that a direction along a plane including a longitudinal direction of the predetermined member 61 and the axial direction of the output shaft 31 (Z axis direction) intersects perpendicularly with a direction from the output shaft 31 to the first detection element 52.

Therefore, even in a state before rotation of the arm (predetermined member 61) indicated by a dashed-line in FIG. 22, or even in a state after rotation of the arm indicated by a solid line, the plane including longitudinal direction of the predetermined member 61 and the axial direction of the output shaft 31 always intersects perpendicularly with the direction from the output shaft 31 to the first detection element 52A.

Therefore, the deflection angle component βm calculated based on the angular position detected by the first detection element 52A has a characteristic equal to the input angle θm=0° in FIG. 21 regardless of the input angle θm.

That is, it is possible to maximize the change in the relative position between the disk 51 of the output shaft encoder 50 and the first detection element 52A.

Therefore, it is possible to accurately calculate the deflection angle component βm of the output shaft 31.

The present embodiment has the following advantages. Here, only the differences from the first and second embodiments will be described.

(ix) Considering only the deflection angle component βm of the output shaft 31 with respect to the predetermined direction, it is equal to fix the deflection direction of the output shaft 31.

The first difference, the position of the first detection element 52A with respect to the output shaft 31, and the deflection angle component βm of the output shaft 31 have a correlation, and a relational expression is established between them.

Assuming that there is no influence of twist due to elastic deformation of the output shaft 31, the position of the first detection element 52A with respect to the disk 51 is known, and the number of the calculated difference (the first difference), that is, the number of the relational expressions established is equal to or more than unknown state quantities (a deflection angle component βm).

Therefore, on the assumption that there is no influence of twist due to elastic deformation of the output shaft 31, the deflection angle component βm of the output shaft 31 to the predetermined direction can be calculated based on the calculated first difference and the position of the first detection element 52A with respect to the output shaft 31.

(x) The deflection angle component βm of the output shaft 31 can be detected based on the angular position detected by the first detection element 52A of the input shaft encoder 40 and the output shaft encoder 50 even when the external force is acting on the output shaft 31.

Therefore, it is possible to accurately detect the deflection angle component βm while suppressing the existing configuration from changing.

(xi) The plane including the longitudinal direction of the predetermined member 61 and the axial direction of the output shaft 31 always intersects perpendicularly with the direction from the output shaft 31 to the first detection element 52A.

Therefore, when the output shaft 31 is deflected along the plane including the longitudinal direction of the predetermined member 61 and the axial direction of the output shaft 31, it is possible to maximize the change in the relative position between the disk 51 of the output shaft encoder 50 and the first detection element 52A.

Therefore, it is possible to accurately calculate the deflection angle component βm of the output shaft 31 with respect to the direction (predetermined direction) along the plane including the longitudinal direction of the predetermined member 61 and the axial direction of the output shaft 31.

(xii) The disk 51 of the output shaft encoder 50 is attached to the housing 11 that fixes the speed reducer 30.

Further, the first detection element 52A is attached to the predetermined member 61 that rotates integrally with the output shaft 31.

Therefore, even when the predetermined member 61 rotates with the rotation of the output shaft 31, the first detection element 52A also rotates with the predetermined member 61, thereby a state that the deflection direction of the output shaft 31 and the direction from the output shaft 31 to the first detection element 52A can be kept perpendicular to each other.

Therefore, it is possible to accurately calculate the deflection angle component βm of the output shaft 31 with respect to the predetermined direction regardless of the angular position of the output shaft 31.

It should be noted that the third embodiment may be modified as follows.

(a) As in the first and second embodiments, a configuration that the disk 51 of the output shaft encoder 50 is attached to the output shaft 31, and the first detection element 52A is attached to the casing of the output shaft encoder 50, that is, the housing 11 (or the speed reducer 30) may be adopted.

(b) It is also possible to adopt a configuration in which the plane including the longitudinal direction of the predetermined member 61 and the axial direction of the output shaft 31 does not intersect perpendicularly with the direction from the output shaft 31 to the first detection element 52A.

However, since as the angle between the plane and the direction from the output shaft 31 to the first detection element 52A approaches 0°, the deflection angle component βm approaches 0, it is desirable that the angle is close to 90°.

Further, in each of the embodiments described above, not only the arm of the robot 1 but also a so-called manipulator can be adopted.

It should be noted that the deflection angle detection device of each of the above-described embodiments can be applied as long as it is a rotation mechanism including the speed reducer 30 having the input shaft 21 and the output shaft 31.

What is claimed is:

1. A deflection angle detection device including
an input shaft encoder that detects an angular position of an input shaft of a speed reducer,
a disk attached to an output shaft of the speed reducer, and
an output shaft encoder having a first detection element, a second detection element, and a third detection element disposed at different positions with respect to the disk and which respectively detect an angular position of the disk, the deflection angle detection device comprising:
a basic angular position calculator that calculates a basic angular position that is an angular position of the output shaft based on the angular position of the input shaft detected by the input shaft encoder;
a first angular position calculator that calculates a first angular position that is an angular position of the output shaft based on an angular position of the disk detected by the first detection element;
a second angular position calculator that calculates a second angular position that is an angular position of the output shaft based on an angular position of the disk detected by the second detecting element;
a third angular position calculator that calculates a third angular position that is an angular position of the output shaft based on an angular position of the disk detected by the third detecting element;
a difference calculator that calculates a first difference which is a difference between the basic angular position calculated by the basic angular position calculator and the first angular position calculated by the first angular position calculator, a second difference which is a difference between the basic angular position and the second angular position calculated by the second angular position calculator, and a third difference which is a difference between the basic angular position and the third angular position calculated by the third angular position calculator; and
a deflection angle calculator that calculates a deflection angle of the output shaft based on the first difference, the second difference, and the third difference calculated by the difference calculator, and positions of the first detection element, the second detection element, and the third detection element with respect to the disk.

2. The deflection angle detection device according to claim 1, wherein,
the deflection angle detection device includes a deflection direction calculator that calculates a deflection direction of the output shaft based on the first difference, the second difference, and the third difference calculated by the difference calculator, and positions of the first detection element, the second detection element, and the third detection element with respect to the disk.

3. The deflection angle detection device according to claim 1, wherein,
the deflection angle detection device includes a twist angle calculator that calculates a twist angle due to elastic deformation of the output shaft based on the first difference, the second difference, and the third difference calculated by the difference calculator, and positions of the first detection element, the second detection element, and the third detection element with respect to the disk.

4. A deflection angle detection device according to claim 1, wherein,
the first detection element, the second detection element, and the third detection element are disposed at equal intervals along a circumferential direction of the disk.

5. The deflection angle detection device according to claim 1, wherein,
in a projection to a predetermined plane where the first detection element, the second detection element, and the third detection element are disposed,
with respect to a center line of the output shaft as a rotation center, regarding an angular position $\alpha 1$ of the first detection element, an angular position $\alpha 2$ of the second detection element, and an angular position $\alpha 3$ of the third detection element, a deflection amount d corresponding to a deflection direction angle $\theta d$ indicating a deflection direction of the output shaft, the twist angle $\Delta \theta z$ due to elastic deformation of the output shaft, and the deflection angle β, a distance R from the rotation center to each detection element, the first difference $\Delta \theta 12$, the second difference $\Delta \theta 22$, and the third difference $\Delta \theta 32$,
assuming that $\tan(\alpha 1+\Delta \theta 12+\Delta \theta z)=(R \sin \alpha 1-d \sin \theta d)/(R \cos \alpha 1-d \cos \theta d)$, $\tan(\alpha 2+\Delta \theta 22+\Delta \theta z)=(R \sin \alpha 2-d \sin \theta d)/(R \cos \alpha 2-d \cos \theta d)$, and $\tan(\alpha 3+\Delta \theta 32+\Delta \theta z)=(R \sin \alpha 3-d \sin \theta d)/(R \cos \alpha 3-d \cos \theta d)$ are established,
the deflection angle calculator calculates the deflection direction angle $\theta d$, the deflection amount d, and the twist angle $\Delta \theta z$, and calculates the deflection angle β based on the deflection amount d.

6. A deflection angle detection device including
an input shaft encoder that detects an angular position of an input shaft of a speed reducer, a disk attached to an output shaft of the speed reducer, and an output shaft encoder having a first detection element and a second detection element disposed at different positions with respect to the disk and which respectively detect an angular position of the disk, the deflection angle detection device comprising:

a basic angular position calculator that calculates a basic angular position that is an angular position of the output shaft based on the angular position of the input shaft detected by the input shaft encoder;

a first angular position calculator that calculates a first angular position that is an angular position of the output shaft based on an angular position of the disk detected by the first detection element;

a second angular position calculator that calculates a second angular position that is an angular position of the output shaft based on an angular position of the disk detected by the second detecting element;

a difference calculator that calculates a first difference which is a difference between the basic angular position calculated by the basic angular position calculator and the first angular position calculated by the first angular position calculator, and a second difference which is a difference between the basic angular position and the second angular position calculated by the second angular position calculator; and a deflection angle calculator that calculates a deflection angle of the output shaft based on the first difference and the second difference calculated by the difference calculator, and positions of the first detection element and the second detection element with respect to the disk assuming that there is no influence of twist due to elastic deformation of the output shaft.

7. The deflection angle detection device according to claim 6, wherein, the deflection angle detection device includes a deflection direction calculator that calculates a deflection direction of the output shaft based on the first difference and the second difference calculated by the difference calculator, and also based on positions of the first detection element and the second detection element with respect to the disk.

8. The deflection angle detection device according to claim 6, wherein in a projection to a predetermined plane where the first detection element and the second detection element are disposed, with respect to a center line of the output shaft as a rotation center, regarding an angular position $\alpha 1$ of the first detection element, and an angular position $\alpha 2$ of the second detection element, a deflection amount d corresponding to a deflection direction angle $\theta d$ indicating a deflection direction of the output shaft, the twist angle $\Delta \theta z$ due to elastic deformation of the output shaft, and the deflection angle $\beta$, a distance R from the rotation center to each detection element, the first difference $\Delta \theta 11$, and the second difference $\Delta \theta 21$, assuming that $\tan(\alpha 1+\Delta \theta 11)=(R \sin \alpha 1-d \sin \theta d)/(R \cos \alpha 1-d \cos \theta d)$, and $\tan(\alpha 2+\Delta \theta 21)=(R \sin \alpha 2-d \sin \theta d)/(R \cos \alpha 2-d \cos \theta d)$ are established, the deflection angle calculator calculates the deflection direction angle $\theta d$, and the deflection amount d, and calculates the deflection angle $\beta$ based on the deflection amount d.

9. A deflection angle detection device including an input shaft encoder that detects an angular position of an input shaft of a speed reducer, and an output shaft encoder having a disk and a first detection element that detects an angular position of the disk, the deflection angle detection device comprising:

a basic angular position calculator that calculates a basic angular position that is an angular position of the output shaft based on the angular position of the input shaft detected by the input shaft encoder;

a first angular position calculator that calculates a first angular position that is an angular position of the output shaft based on an angular position of the disk detected by the first detection element;

a difference calculator that calculates a first difference which is a difference between the basic angular position calculated by the basic angular position calculator and the first angular position calculated by the first angular position calculator; and a deflection angle component calculator that calculates a deflection angle component of the output shaft with respect to a predetermined direction based on the first difference calculated by the difference calculator, and a position of the first detection element with respect to the disk assuming that there is no influence of twist due to elastic deformation of the output shaft.

10. The method according to claim 9, wherein, the disk is attached to a first predetermined member that fixes the speed reducer, the first detection element is attached to a second predetermined member that rotates integrally with the output shaft, and a direction along a plane including a longitudinal direction of the second predetermined member and an axial direction of the output shaft intersects perpendicularly with a direction from the output shaft to the first detection element.

11. The deflection angle detection device according to claim 9, wherein, in a projection to a predetermined plane where the first detection element is disposed, with respect to a center line of the output shaft as a rotation center, regarding an angular position $\alpha 1$ of the first detection element, a deflection amount d corresponding to a deflection direction angle $\theta d$ indicating a deflection direction of the output shaft and the deflection angle component $\beta m$, a distance R from the rotation center to each detection element, the first difference $\Delta \theta 12$, assuming that $\tan(\alpha 1+\Delta \theta 11)=(R \sin \alpha 1-d \sin \theta d)/(R \cos \alpha 1-d \cos \theta d)$ is established, the deflection angle calculator calculates the deflection amount d, and calculates the deflection angle component $\beta m$ based on the deflection amount d.

12. The deflection angle detection device according to claim 11, wherein, the predetermined direction is calculated based on the angular position of the input shaft detected by the input shaft encoder, and a control of the angular position of the input shaft is corrected based on the calculated predetermined direction and the calculated deflection angle component.

13. A deflection angle detection device including an input shaft encoder that detects an angular position of an input shaft of a speed reducer, a disk attached to an output shaft of the speed reducer, and an output shaft encoder having a first detection element, a second detection element, and a third detection element disposed at different positions with respect to the disk and which respectively detect an angular position of the disk, the deflection angle detection device comprising:

- a basic angular position calculator that calculates a basic angular position that is an angular position of the output shaft based on the angular position of the input shaft detected by the input shaft encoder;
- a first angular position calculator that calculates a first angular position that is an angular position of the output shaft based on an angular position of the disk detected by the first detection element and an position of the first detecting element with respect to the disk;
- a second angular position calculator that calculates a second angular position that is an angular position of the output shaft based on an angular position of the disk detected by the second detecting element and an position of the second detecting element with respect to the disk;
- a third angular position calculator that calculates a third angular position that is an angular position of the output shaft based on an angular position of the disk detected by the third detecting element and an position of the third detecting element with respect to the disk;
- a difference calculator that calculates a first difference which is a difference between the basic angular position calculated by the basic angular position calculator and the first angular position calculated by the first angular position calculator, a second difference which is a difference between the basic angular position and the second angular position calculated by the second angular position calculator, and a third difference which is a difference between the basic angular position and the third angular position calculated by the third angular position calculator; and
- a deflection angle calculator that calculates a deflection angle of the output shaft based on the first difference, the second difference, and the third difference calculated by the difference calculator.

14. The deflection angle detection device according to claim 1, wherein,
- the speed reducer is disposed at a joint that connects rotation axes of a robot;
- the deflection angle detection device includes:
- a first controller that controls the robot in a predetermined posture in a calibration of the robot and causes the deflection angle calculator to calculate the deflection angle of the output shaft;
- a second controller that controls the robot in a predetermined posture during operation of the robot and causes the deflection angle calculator to calculate the deflection angle of the output shaft; and
- a determiner that determines that an abnormal external force is acting on the robot when a deviation between the deflection angle of the output shaft calculated by the first controller and the deflection angle of the output shaft calculated by the second controller is equal to or larger than the predetermined deviation.

15. The deflection angle detection device according to claim 13, wherein,
- the speed reducer is disposed at a joint that connects rotation axes of a robot;
- the deflection angle detection device includes:
- a first controller that controls the robot in a predetermined posture in a calibration of the robot and causes the deflection angle calculator to calculate the deflection angle of the output shaft;
- a second controller that controls the robot in a predetermined posture during operation of the robot and causes the deflection angle calculator to calculate the deflection angle of the output shaft; and
- a determiner that determines that an abnormal external force is acting on the robot when a deviation between the deflection angle of the output shaft calculated by the first controller and the deflection angle of the output shaft calculated by the second controller is equal to or larger than the predetermined deviation.

\* \* \* \* \*